United States Patent
Yokota et al.

(10) Patent No.: US 8,316,248 B2
(45) Date of Patent: Nov. 20, 2012

(54) VIRTUAL PC MANAGEMENT METHOD, VIRTUAL PC MANAGEMENT SYSTEM, AND VIRTUAL PC MANAGEMENT PROGRAM

(75) Inventors: Daisuke Yokota, Kawasaki (JP); Akihisa Nagami, Yokohama (JP); Fumio Noda, Kodaira (JP); Masayuki Tosaka, Ebina (JP)

(73) Assignee: Hitachi, Ltd., Tokyo (JP)

( * ) Notice: Subject to any disclaimer, the term of this patent is extended or adjusted under 35 U.S.C. 154(b) by 510 days.

(21) Appl. No.: 12/511,782

(22) Filed: Jul. 29, 2009

(65) Prior Publication Data

US 2010/0083015 A1  Apr. 1, 2010

(30) Foreign Application Priority Data

Oct. 1, 2008  (JP) ................................. 2008-256779

(51) Int. Cl.
  *G06F 9/00* (2006.01)
  *G06F 15/177* (2006.01)

(52) U.S. Cl. ................ 713/310; 713/1; 713/2; 713/100; 709/224; 709/226

(58) Field of Classification Search .................. 713/1, 2, 713/100, 300, 310; 709/224, 226
  See application file for complete search history.

(56) References Cited

U.S. PATENT DOCUMENTS

2008/0104587 A1* 5/2008 Magenheimer et al. .......... 718/1
2009/0210527 A1* 8/2009 Kawato ......................... 709/224

FOREIGN PATENT DOCUMENTS

| JP | 2006-252168 | 9/2006 |
| JP | 2007-088960 | 4/2007 |
| JP | 2007-300665 | 11/2007 |
| JP | 2008-152591 | 7/2008 |
| JP | 2009-075654 | 4/2009 |

* cited by examiner

*Primary Examiner* — Kim Huynh
*Assistant Examiner* — Michael J Brown
(74) *Attorney, Agent, or Firm* — Foley & Lardner LLP

(57) ABSTRACT

The virtual PC management system includes: a unit which acquires a power on/off state of a virtual machine from a computer via the network and stores it in a storage; a unit which acquires a power on/off state of a computer from the computer via the network and stores it into the storage; a unit which receives a start-of-use request for a virtual machine from the client machine and searches stored data of the storage unit for a computer which is in a power-on state and to which a virtual machine is not allocated, as an allocation candidate; a unit which allocates the virtual machine in accordance with the start-of-use request to the computer of the allocation candidate; and a unit which notifies, via the network, the computer of the allocation candidate of an instruction to turn on the power of the virtual machine.

8 Claims, 10 Drawing Sheets

FIG.5A

| PHYSICAL POSITION UNIT (10) | POWER CONTROL UNIT (11) | HOST SERVER ID (12) | POWER ON/OFF STATE (13) | VIRTUAL PC ID (14) | VIRTUAL PC POWER ON/OFF STATE (15) | IP ADDRESS (16) |
|---|---|---|---|---|---|---|
| r1 | p1 | bs1 | ON | v1 | ON | 192.0.0.1 |
| r1 | p1 | bs1 | ON | v2 | OFF | 192.0.0.2 |
| r1 | p1 | bs2 | OFF | v3 | OFF | 192.0.0.3 |
| r1 | p1 | bs2 | OFF | v4 | OFF | 192.0.0.4 |
| r1 | p2 | bs3 | OFF | v5 | OFF | 192.0.0.5 |
| r1 | p2 | bs3 | OFF | UN-ALLOCATED | - | - |

FIG.5B

| USER IDENTIFIER (17) | VIRTUAL PC ID (18) |
|---|---|
| u001 | v1 |
| u002 | v2 |
| - | - |

VIRTUAL PC MANAGEMENT METHOD, VIRTUAL PC MANAGEMENT SYSTEM, AND VIRTUAL PC MANAGEMENT PROGRAM

INCORPORATION BY REFERENCE

This application claims priority based on a Japanese patent application, No. 2008-256779 filed on Oct. 1, 2008, the entire contents of which are incorporated herein by reference.

BACKGROUND

The present invention relates to a virtual PC management method, a virtual PC management system, and a virtual PC management program, and specifically relates to technique of reducing power consumption in a thin client system using a virtual PC.

Applicability of a computer is expanded and a computer is beginning to be utilized even in a field requiring firm security which can prevent unfavorable events, such as an information leak of, or an unauthorized access to, company secret or the like. Performance of a computer has improved and a portable computer can be utilized now not only inside a building of a company in which security is secured, but outside the building, such as at home and on business trip.

In order to cope with such a situation, a secure computer system has been devised, in which a computer for processing a file on which an important company secret is recorded is installed inside the building where security is secured, and the computer inside the building is operated by remote control when a portable computer is used outside the building. In the system, the portable computer sends keyboard input data, etc., by man to the computer inside the building. On the other hand, the computer inside the building processes a file on which a company secret is recorded, and sends only an image of the execution screen to the portable computer. Accordingly, the file on which the company secret is recorded is not taken out outside the building, therefore, an information leak in units of file and an unauthorized access can be prevented.

As for the computer inside the building, there is a method of utilizing a virtual PC in addition to the ordinary PC. A virtual PC is a PC which another computer creates by emulating software-wise the hardware which composes a computer. The virtual PC can be executed like the ordinary PC from a program, since the (emulated) hardware can be utilized like a physical hardware. When a user utilizes the virtual PC by remote operation, the user can utilize the virtual PC like the ordinary PC. The virtual PC is provided by a computer which emulates the hardware (the computer is called a host server in the following). A host server can provide several sets of virtual PCs, although it depends on the processing capacity.

As a technique relevant to such a system, the following method is proposed, in which, in a thin-client-type information processing system, for example, a blade PC and a host server are provided in an intermingled manner. The subject matter in the proposed method is how to control allocation to these terminals.

Namely, the proposed method is for allocating an information processor in an information processing system which includes plural information processors, a managing server to manage the information processors concerned, and plural terminals which are coupled each other via a network. The managing server receives an allocation request of an information processor via the network from one of the terminals; responding to the received allocation request concerned, the managing server determines an information processor to be allocated to the allocation requesting terminal, based on allocation state information to the terminal of the information processor, stored in a first storage unit, and allocation condition information of the information processor to a user of the terminal, stored in a second storage unit; the managing server sends destination information of the determined information processor concerned to the allocation request terminal via the network; and the managing server updates the allocation state to the terminal of the information processor concerned stored in the first storage unit, from an un-allocated state to the state indicating that the allocation is made to the allocation requesting terminal concerned. The terminal sends an allocation request of the information processor to the managing server via the network; the terminal receives the destination information of the information processor allocated to the terminal concerned via the network from the managing serve; and the terminal communicates with an information processor which possesses the destination information concerned using the received destination information. The information processor communicates with the terminal to which the destination information of the information processor concerned is sent via the network from the managing server. (Refer to Japanese Patent Laid-open No. 2008-152591).

SUMMARY

In the system described above, correspondence relation between a user and a computer which the user utilizes is managed by a server etc., and when the user demands a start of remote operation, the server needs to determine a computer of a coupling destination. In the technique disclosed by Japanese Patent Laid-open No. 2008-152591, the server has the fixed correspondence relation and the same computer is always assigned to the user.

Here, power consumption is considered for cases where a computer assigned to a user is a virtual PC. In the case of the ordinary PC, the power source of a PC can be cut off to timing when a user stops the use of the PC. However, in the case of a virtual PC, even if the power source of the virtual PC is cut off, the host server continues operating, accordingly it does not lead to electric power saving. When at least one virtual PC is utilized, the power source of the host server cannot be stopped.

Therefore, when few virtual PCs are used but when those virtual PCs are dispersed and provided by many host servers, the power source of the host servers which are providing the virtual PCs can not be stopped, therefore the power is consumed vainly.

The present invention has been made in view of the above circumstances and provides a technique of reducing power consumption in a thin client system which uses a virtual PC.

A virtual PC management method of the disclosed system to solve the problem is practiced by a managing server, as a core, which manages correspondence relation between a virtual machine and a computer provided by the virtual machine concerned. When a client machine (a thin client terminal) operated by a user uses the computer (a blade PC etc.) in a thin client coupling, a technique is provided in which a virtual machine (a virtual PC), which the computer provides to the client machine, is assigned in consideration of power consumption reduction. The virtual machine is a computer which a computer possessing actually a physical hardware creates by emulating software-wise the hardware which composes a computer. A computer can provide several sets of virtual machines according to the processing capacity.

The virtual machine is created by virtualization software. Such virtualization software is software called a virtual machine monitor (VMM). Ordinarily, the software is used to divide a single computer as if plural computers are used.

As the computer, for example, a blade PC can be assumed. A blade PC is inserted in a storing compartment in a chassis for use. In the back side of the storing compartment of the chassis, one set of a power supply terminal, an interface of a network line, and various cables are provided detachably with each blade PC, allowing easy extension and exchange of a blade PC. Ordinarily, the chassis can accommodate several sets of blade PCs (=computers), and serves as one power supply unit which supplies power to each blade PC. The chassis is accommodated in a housing device (a rack etc.). An area 3 where some housing devices are located is maintained at a prescribed temperature with an air-conditioner 4.

In such a virtual PC management method of the disclosed system, the managing server executes the processes of acquiring a power on/off state of the virtual machine as first power on/off state data from the computer via the network, and storing the first power on/off state data into a storage unit; and acquiring a power on/off state of the computer as second power on/off state data from the computer via the network, and storing the second power on/off state data into the storage unit. In order to obtain data of the power on/off state, the managing server sends a reply request of the power on/off state to a baseboard management controller (BMC) of the blade PC, for example. The BMC supports an IPMI specification. The BMC monitors a predetermined event by communicating with various sensors (temperature, voltage, a fan, a bus, etc.) on a system board in the blade PC, sends a warning and a log event when a parameter exceeds a reference value, and performs remote control of the power source, and others. The present BMC can also execute answering to a data request about the power on/off state of the blade PC. Since the computer which provides the virtual machine naturally grasps about the power source situation of the virtual machine, what is necessary for the managing server is just to make a request to the computer.

The managing server executes the processes of receiving a start-of-use request of a virtual machine from a client machine, and searching the stored data of the storage unit for a computer which is in a power-on state and to which a virtual machine is not allocated, as an allocation candidate. An increase in power consumption from the present state can be suppressed, by allocating a virtual machine to a computer of which the power source is already set to ON and to which a virtual machine is not allocated currently, rather than turning on a power source of a computer which is currently in a power-off state and allocating a virtual machine to the computer newly.

The managing server executes the process of allocating the virtual machine according to the start-of-use request to the computer of the allocation candidate. The managing server executes the process of notifying the computer of the allocation candidate of an instruction to turn on the power source of the virtual machine, via the network. The virtual machine of which the power source has been set to ON establishes thin client coupling with the client machine and accepts the use by the client machine.

It is also preferable that the managing server stores, in the storage unit, an allocatable number of virtual machines and data of an allocated virtual machine in each computer. In the present case, the managing server executes the processes of receiving the start-of-use request from the client machine, and searching the stored data of the storage unit for a computer which is in a power-on state and possesses the number of allocated virtual machines smaller than the allocatable number, as an allocation candidate. Namely, an increase in power consumption from the present state can be suppressed, by allocating a virtual machine to a computer of which the power source is already set to ON and which has allocatable capacity of a virtual machine, rather than turning on a power source of a computer which is currently in a power-off state and allocating a virtual machine to the computer newly.

At this time, the managing server executes the process of allocating the virtual machine according to the start-of-use request to the computer of the allocation candidate.

It is also preferable that the managing server stores, in the storage unit, correspondence relation between the computer and a power supply unit which supplies power to the computer concerned. In the present case, the managing server executes the processes of receiving a start-of-use request for a virtual machine from the client machine, searching the stored data of the storage unit for a power supply unit possessing a power supply target which includes a computer in a power-on state and a computer in a power-off state, and specifying, as an allocation candidate, a computer in a power-off state included in the power supply target of the searched power supply unit. By confirming the power on/off state of every chassis (=a power supply unit) which accommodates a computer, and by making a computer in a power-off state as an allocation candidate in a chassis in which a computer in a power-on state and a computer in a power-off state are intermingled, it is possible to avoid a new resumption of power supply to a power supply unit in which all accommodated computers are currently in a power-off state, for example, and to suppress an increase in power consumption by using a power supply unit in which a power supply is already practiced.

In the present case, the managing server executes the processes of notifying the computer of the allocation candidate of an instruction to turn on the power, via the network, and allocating the virtual machine according to the start-of-use request to the computer which becomes in a power-on state.

It is also preferable that the managing server stores, in the storage unit, correspondence relation between the computer and a housing device which accommodates a power supply unit supplying power to the computer concerned. At this time, the managing server executes a process of receiving a start-of-use request for a virtual machine from the client machine; a process of extracting, from the stored data of the storage unit, a power supply unit accommodated in each housing device, a computer as a power supply target of the power supply unit concerned, and power on/off state data of each computer; a process of specifying a housing device accommodating a smallest number of computers in a power-on state by calculating the number of computers in a power-on state for every housing device; and a process of specifying, as an allocation candidate, a computer in a power-off state among the computers associated with the specified housing device. Namely, a housing device of which the current power consumption is minimum among the housing devices is specified, and when a computer accommodated in the housing device has allocatable capacity of a virtual machine, a virtual machine is allocated to the computer concerned. Accordingly, power consumption among the housing devices is balanced.

In the present case, the managing server executes the processes of notifying, via the network, the computer of the allocation candidate of an instruction to turn on the power of the computer concerned, and allocating the virtual machine according to the start-of-use request to the computer which has become in a power-on state.

It is also preferable that the managing server stores, in the storage unit, an allocatable number of virtual machines and data of an allocated virtual machine in each computer, data of correspondence relation between the computer and a power supply unit which supplies power to the computer concerned, and data of correspondence relation between the computer and a housing device which accommodated the power supply unit supplying power to the computer concerned.

In the present case, the managing server executes the processes of receiving a start-of-use request for a virtual machine from the client machine, and searching the stored data of the storage unit, as a first priority candidate, for a computer which is in a power-on state and to which a virtual machine is not allocated; as a second priority candidate, for a computer which is in a power-on state and possesses allocated virtual machines the number of which is smaller than an allocatable number; as a third priority candidate, for a computer which is in a power-off state and included in a power supply target of a power supply unit including a computer in a power-on state and a computer in a power-off state in the power supply target; and, as a fourth priority candidate, for a computer which is in a power-off state among computers associated with a housing device accommodating the smallest number of computers in a power-on state. That is, priority is given to the result of each search process of the allocation candidate already described in the above.

The managing server executes the processes of specifying as an allocation candidate a computer possessing highest priority among the computers searched by the searching, and allocating the virtual machine according to the start-of-use request to the computer. The managing server executes the process of notifying, via the network, the computer of the allocation candidate of an instruction to turn on the power of the virtual machine.

It is also preferable that the managing server stores, in the storage unit, an allocatable number of virtual machines, data of an allocated virtual machine in each computer, and data defining criteria of calculation performance or power consumption tendency of a computer corresponding to the number of virtual machines to be provided.

In the present case, the managing server performs the processes of extracting the number of allocated virtual machines in each computer from the stored data of the storage unit and searching the stored data of the storage unit for the criteria of calculation performance or power consumption tendency of a computer which corresponds to the extracted number of virtual machines.

The managing server executes the process of notifying each computer of an instruction indicating change to the calculation performance or the power consumption tendency which correspond to the criteria specified by the searching. The computer is provided with a unit for changing the calculation performance and the power consumption, such as a CPU clock frequency alteration unit and a power saving mode management unit.

It is also preferable that the managing server executes the processes of receiving a deactivation request for the virtual machine by the user from the virtual machine, monitoring whether the power on/off state of the virtual machine is changed from ON to OFF, and detecting that the power on/off state turns off for all virtual machines allocated to the computer which has provided the virtual machine, and notifying the computer of an instruction to turn off the power of the computer, via the network. According to the method, it is possible to suppress occurrence of useless power consumption which may be generated by maintaining a power-on state for a computer which does not provide a virtual machine currently.

It is also preferable that the virtual machine executes the processes of detecting a state of communication coupling with the client machine and frequency of remote operation, and notifying the managing server that communication coupling with the client machine has been cut off and that no remote operation has been performed for a given length of time.

In the present case, the managing server executes the processes of receiving the notice from the virtual machine, specifying another computer as an allocation destination of the virtual machine by searching for the allocation candidate, and changing the allocation destination of the virtual machine to the computer of the allocation candidate specified. Namely, a virtual machine which is in a power-on state but not used is allocated to a computer of a transfer destination which is searched by the same logic as the search logic of the allocation candidate described above. When executing such a process, the concentration of allocation destinations of a virtual machine, that is, the concentration of activated power sources advances further, leading to the reduction of power consumption as the entire system.

It is also preferable that, when changing the allocation destination of the unused virtual machine described above, the managing server or a computer as the original allocation destination executes hibernation with respect to the virtual machine. According to the hibernation, a state just before the power-off of the virtual machine (mainly data on a memory: various data and information of boot application, etc.) is stored in a hard disk drive of the managing server or the computer. When the power source of the virtual machine is turned on in a computer of a new allocation destination, the stored information is read from the hard disk drive of the managing server or the original computer to a memory of a new computer, and the work can be resumed from the state just before the power-off.

It is possible to consider network boot as the technique of turning on a power source of a computer or a virtual machine via a network. The network boot is one of the starting methods of an OS, and is the technique to activate an OS by downloading an image of the OS via a network, instead of activating the OS from a hard disk, etc. For example, a computer can be activated when a memory of the computer reads a disk image (a boot disk) stored on the managing server side. Control of the power on/off of the computer can be executed by performing a Wake-on-LAN request to the computer from the managing server, for example.

At the time of allocation of a virtual machine, the managing server allocates an IP address to the virtual machine. The network boot of the virtual machine is executed based on the IP address. The IP address of the virtual machine of which the allocation is completed is notified to the client machine. The managing server which executes the allocation of the IP address and the process of network boot is regarded as a DHCP server (a Dynamic Host Configuration Protocol server), as well as a PXE server (a Preboot eXecution Environment server). The PXE server transfers a boot image to a virtual machine and others which perform network boot. It is possible even for a system equipped only with a formatted hard disk to perform a management operation such as booting, OS installation/updating, and diagnosis at the time of OS failure, by remote operation.

A virtual PC management system according to the disclosed system serves as a computing system for managing, in a storage unit, correspondence relation between a virtual machine remotely operable by a client machine via a network and a computer to provide the virtual machine concerned, and includes the following units.

Namely, the virtual PC management system includes: a first storing unit which acquires a power on/off state of the virtual machine as first power on/off state data from the computer via the network and stores the first power on/off state data into the storage unit; a second storing unit which acquires a power on/off state of the computer as second power on/off state data from the computer via the network and stores the second power on/off state data into the storage unit; a detecting unit which receives a start-of-use request for a virtual machine from the client machine and searches stored data of the storage unit for a computer which is in a power-on state and to which a virtual machine is not allocated, as an allocation candidate; an allocating unit which allocates the virtual machine in accordance with the start-of-use request to the computer of the allocation candidate; and a notifying unit which notifies, via the network, the computer of the allocation candidate of an instruction to turn on the power of the virtual machine.

A virtual PC management program according to the disclosed system makes a computer execute the following steps, where the computer manages, in a storage unit, correspondence relation between a virtual machine remotely operable by a client machine via a network and a computer to provide the virtual machine concerned.

Namely, the steps includes acquiring a power on/off state of the virtual machine as first power on/off state data from the computer via the network and storing the first power on/off state data into the storage unit; acquiring a power on/off state of the computer from the computer as second power on/off state data via the network and storing the second power on/off state data into the storage unit; receiving a start-of-use request for a virtual machine from the client machine and searching the stored data of the storage unit for a computer which is in a power-on state and to which a virtual machine is not allocated, as an allocation candidate; allocating the virtual machine in accordance with the start-of-use request to the computer of the allocation candidate; and notifying, via the network, the computer of the allocation candidate of an instruction to turn on the power of the virtual machine.

According to the teaching herein, it is possible to reduce the power consumption in a thin client system using a virtual PC.

These and other benefits are described throughout the present specification. A further understanding of the nature and advantages of the invention may be realized by reference to the remaining portions of the specification and the attached drawings.

BRIEF DESCRIPTION OF THE DRAWINGS

The present invention will become fully understood from the detailed description given and the accompanying drawings given by way of illustration only, wherein:

FIG. 5A is a chart illustrating an example of data structure of a server management table;

FIG. 5B is a chart illustrating an example of data structure of a user management table;

DETAILED DESCRIPTION OF THE EMBODIMENTS

---System Configuration---

Figure 1:
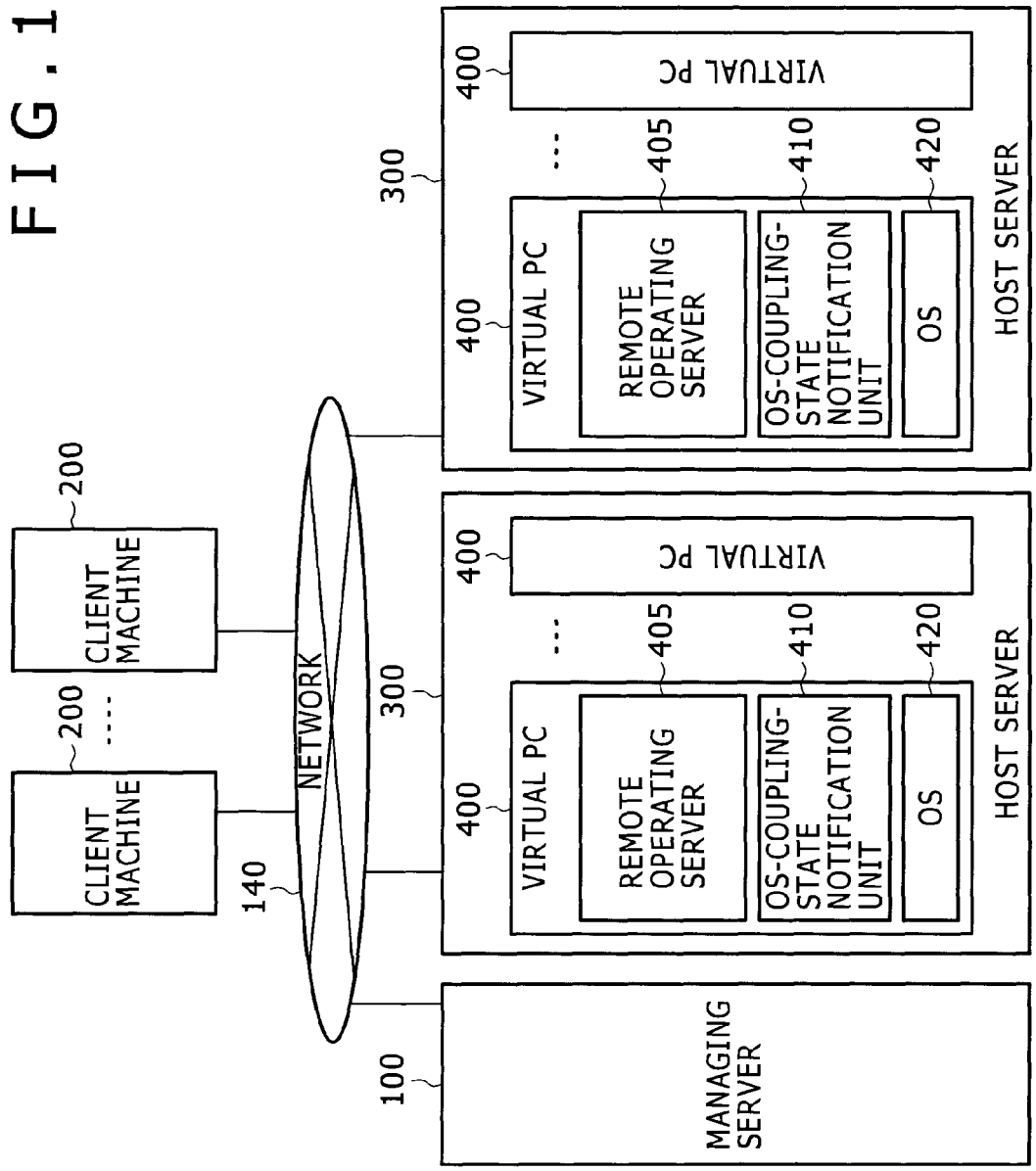
FIG. 1 is a drawing illustrating a network configuration of a virtual PC management system.

Hereinafter, with reference to the accompanying drawings, the examples are explained in detail. FIG. 1 illustrates a network configuration of a virtual PC management system 1 according to the present embodiment. The virtual PC management system 1 illustrated in FIG. 1 includes: plural host servers 300 (blade PCs etc.), each serving as a computer; a client machine 200 which is in a thin client coupling with a host server 300 or a virtual PC 400 (=a virtual machine) provided by the host server 300 concerned; and a managing server 100 which exercises the management of correspondence relation between the plural virtual PCs 400 and the host server 300 providing the plural virtual PCs 400 concerned, and the management of the thin client coupling. The plural host servers 300, the client machine 200, and the managing server 100 are coupled mutually via a network 140.

The host server 300 and the virtual PC 400 construct a VPN (Virtual Private Network) with the client machine 200. The host server 300 and the virtual PC 400 receive and process input information (contents of operation of an input device) sent from the client machine 200 via the VPN and send video information (a desktop screen of a display device) which shows the processed result, to the client machine 200. The host server 300 and the virtual PC 400 act as a server which is not locally coupled to the I/O device usually.

Figure 2:
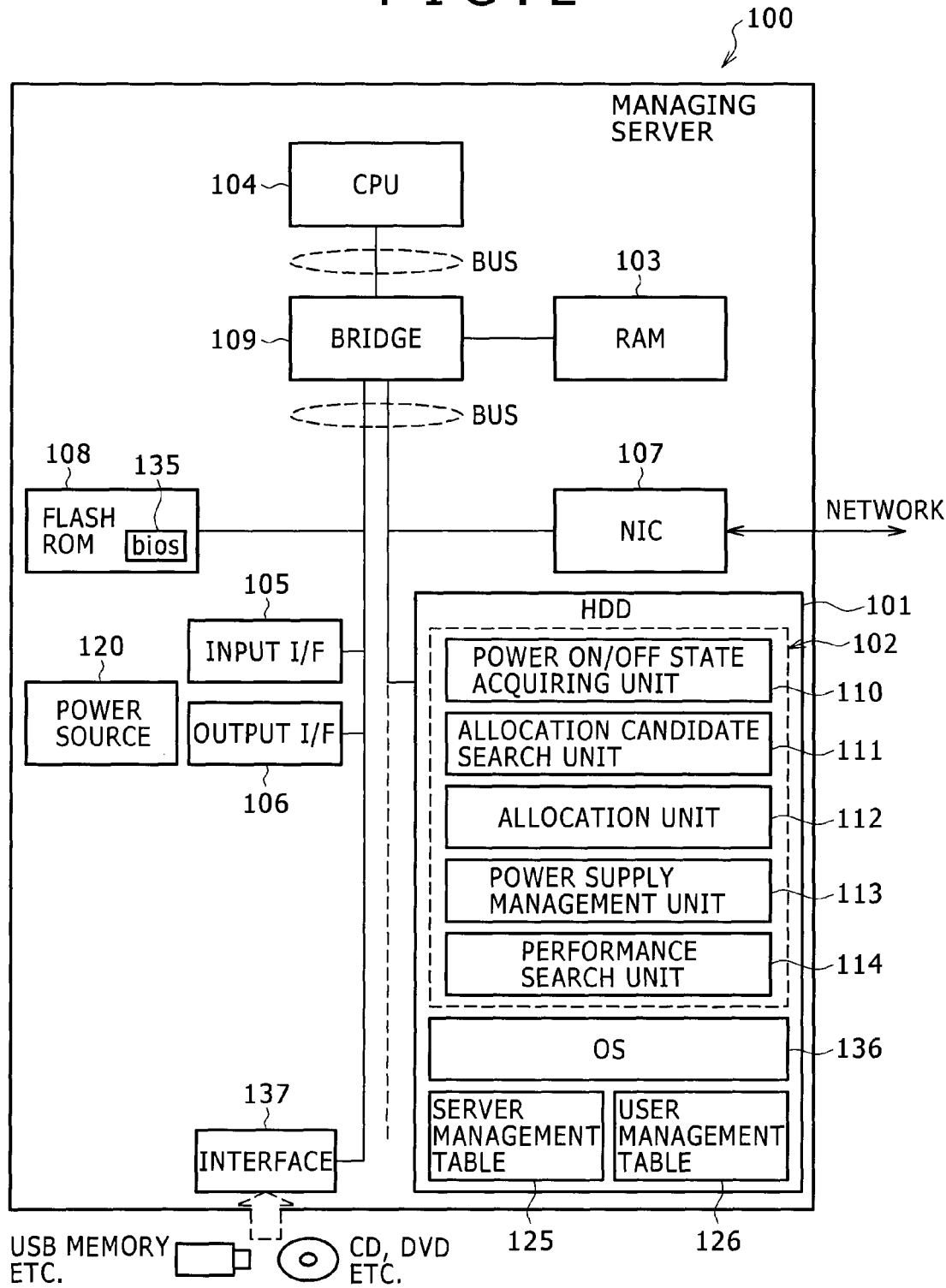
FIG. 2 is a drawing illustrating an example of constitution of a managing server.

Next, each device which composes the virtual PC management system 1 in the present embodiment is explained. FIG. 2 illustrates an example of constitution of the managing server 100 of the present embodiment. The managing server 100 reads a program 102 stored in a hard disk drive 101 etc., into a RAM 103 so that the managing server 100 may be provided with a function to materialize the present embodiment, and makes a CPU 104 as a processing unit execute the program 102. In addition to the example in which the program 102 is stored in the hard disk drive 101 of the managing server 100 from the beginning, another example can be assumed in which the managing server 100 reads and executes the program 102 from various kinds of recording media (CD, DVD, etc.) or storage media (a USB memory etc.), for example, via an interface 137. As yet another example, the program 102 may be offered by a predetermined device via various communication media (a network, a carrier, a digital signal) and executed (in the present case, of course, the managing server 100 is provided with a communication unit according to the communication media).

The managing server 100 may be provided with an input interface 105 for various kinds of buttons etc., and an output interface 106 for a display, etc., if needed. The managing server 100 possesses a NIC (Network Interface Card) 107 which performs data transfer with the host server 300, the virtual PC 400, etc. Naturally, a MAC address is set to the NIC.

With the aid of the NIC 107, the managing server 100 is coupled with the host server 300, the virtual PC 400, and others via the network 140, such as the Internet and LAN, and executes data transfer. The managing server 100 also possesses a flash ROM 108, a bridge 109 which relays a bus coupling each function unit, a device, etc., and a power source 120.

The flash ROM 108 stores a BIOS 135. The CPU 104 recognizes the system configuration of the managing server 100 by accessing the flash ROM 108 first and executing the BIOS 135 after a power source 120 is activated. The hard disk drive 101 stores an OS 136 in addition to function units or databases. The OS 136 is a program for the CPU 104 to execute each unit (to be described later), by performing overall control of each unit of the managing server 100. According to the BIOS 135, the CPU 104 loads the OS 136 from the hard disk drive 101 to the RAM 103 and executes it. Accordingly, the CPU 104 performs overall control of each unit of the managing server 100.

Next, a unit which is composed of and held by the managing server 100 based on the program 102, for example, is explained. It is assumed that the managing server 100 possesses a server management table 125 and a user management table 126 in the hard disk drive 101. Of course, it is also preferable that each of the control tables 125, 126 is stored in another server arranged on the network 140, instead of the present example in which the managing server 100 possesses the control tables 125, 126 in own hard disk drive 101.

The managing server 100 such as described above possesses a power on/off state acquiring unit 110 which acquires a power on/off state of the virtual PC 400 from the host server 300 via the network, and stores the present power on/off state data in the storage unit 101, and which acquires a power on/off state of the host server 300 from the host server 300 via the network, and stores the present power on/off state data in the storage unit 101.

In order to obtain the power on/off state data, the managing server 100 sends a reply request of the power on/off state to a baseboard management controller (a BMC 350) of the host server 300, for example. The BMC 350 supports the IPMI specification, and monitors a predetermined event by communicating with various sensors (temperature, voltage, a fan, a bus, etc.) on a system board in the host server 300, and sends warning and a log event when a parameter exceeds a reference value, or performs remote control of a power source, etc. The BMC 350 can also execute answering to the data request about the power on/off state of the host server 300. Since the host server 300 which provides the virtual PC 400 naturally grasps about the power source situation of the virtual PC 400, what is necessary is just to make a request to the host server 300 from the managing server 100.

The managing server possesses an allocation candidate search unit 111 which receives a start-of-use request of the virtual PC 400 from the client machine 200, and searches the server management table 125 of the storage unit 101 for the host server 300 which is in a power-on state and to which the virtual PC 400 is not allocated, as an allocation candidate. An increase in power consumption from the present state can be suppressed, by allocating the virtual PC 400 to the host server 300 of which the power source is already set to ON and to which the virtual PC 400 is not currently allocated, rather than turning on a power source of a host server 300 which is currently in a power-off state and allocating the virtual PC 400 to the host server 300 newly.

The managing server 100 possesses an allocation unit 112 which executes a process of allocating the virtual PC 400 according to the start-of-use request to the host server 300 of the allocation candidate. The managing server 100 possesses a power supply management unit 113 which notifies the host server 300 of the allocation candidate of an instruction to turn on the power source of the virtual PC 400, via the network. The virtual PC 400 of which the power source has been turned on establishes the thin client coupling with the client machine 200 and accepts the use by the client machine 200.

It is also preferable that the managing server 100 stores an allocatable number of the virtual PC 400 and data of an allocated virtual PC 400, in each host server 300, in the server management table 125 of the storage unit 101. In the present case, the managing server 100 receives the start-of-use request from the client machine 200, and searches the server management table 125 of the storage unit 101 for a host server 300 which is in a power-on state and possesses the number of allocated virtual PC smaller than the allocatable number, as an allocation candidate.

Namely, an increase in power consumption from the present state can be suppressed, by allocating the virtual PC 400 to the host server 300 of which the power source is already set to ON and which has allocatable capacity of the virtual PC 400, rather than turning on a power source of a host server 300 which is currently in a power-off state and allocating the virtual PC 400 to the host server 300 newly.

At this time, the allocation unit 112 executes the process of allocating the virtual PC 400 according to the start-of-use request to the host server 300 of the allocation candidate.

It is also preferable that the managing server 100 stores correspondence relation between the host server 300 and a chassis 30 (a power supply unit) which supplies power to the host server 300 concerned, in the server management table 125 of the storage unit 101. In the present case, the allocation candidate search unit 111 executes the processes of receiving a start-of-use request of the virtual PC 400 from the client machine 200; searching the server management table 125 of the storage unit 101 for a chassis 30 in which a host server 300 in a power-on state and a host server 300 in a power-off state are included in a power supply target; and specifying, as an allocation candidate, the host server 300 which is in a power-off state and included in the power supply target of the chassis 30 searched here.

By confirming the power on/off state of every chassis (=a power supply unit) which accommodates the host server 300, and by making the host server 300 in a power-off state as an allocation candidate in the chassis 30 in which a host server 300 in a power-on state and a host server 300 in a power-off state are intermingled, it is possible to avoid a new resumption of power supply to the chassis 30 in which all the accommodated host servers 300 are currently in a power-off state, for example, and to suppress an increase in power consumption by using the chassis 30 in which a power supply is already practiced.

In the present case, the power supply management unit 113 notifies the host server 300 of the allocation candidate of an instruction to turn on the power source, via the network. The allocation unit 112 executes a process of allocating the virtual PC 400 according to the start-of-use request to the host server 300 which has become in a power-on state.

It is also preferable that the managing server 100 stores correspondence relation between the host server 300 and a rack 20 (a housing device) which accommodates the chassis 30 to supply power to the host server 300 concerned, in the server management table 125 of the storage unit 101. At this time, the allocation candidate search unit 111 executes a process of receiving a start-of-use request of the virtual PC 400 from the client machine 200; a process of extracting, from the server management table 125 of the storage unit 101, the chassis 30 accommodated in each rack 20, the host server 300 as the power supply target of the chassis 30 concerned, and power on/off state data of each host server 300; a process of specifying a rack 20 possessing a minimum number of host servers in a power-on state, by calculating the number of host servers in a power-on state for every rack; and a process of specifying, as an allocation candidate, a host server 300 in a power-off state among the host servers 300 associated with the rack 20 specified here. Namely, a rack 20 of which the current power consumption is minimum among the racks 20 is specified, and when the host server 300 therein has allocatable capacity of the virtual PC 400, the virtual PC 400 is allocated to the host server 300 concerned. Accordingly, power consumption among the racks is balanced.

In the present case, the power supply management unit 113 notifies the host server 300 of the allocation candidate of an instruction to turn on the power source, via the network. The allocation unit 112 executes a process of allocating the virtual PC 400 according to the start-of-use request to the host server 300 which has become in a power-on state.

It is also preferable that the managing server 100 stores, in the server management table 125 of the storage unit 101, an allocatable number of the virtual PC 400 and data of the allocated virtual PC 400 in each host server 300, data of correspondence relation between the host server 300 and the chassis 30 which supplies power to the host server 300 concerned, and data of correspondence relation between the host server 300 and the rack 20 accommodating the chassis 30 which supplies power to the host server 300 concerned.

In the present case, the allocation candidate search unit 111 executes the processes of receiving a start-of-use request of the virtual PC 400 from the client machine 200, and searching the server management table 125 of the storage unit 101, as a first priority candidate, for the host server 300 which is in a power-on state and to which the virtual PC is not allocated, as a second priority candidate, for the host server 300 which is in a power-on state and possesses allocated virtual PC the number of which is smaller than an allocatable number, as a third priority candidate, for the host server 300 which is in a power-off state and included in the power supply target of the chassis 30 including a host server 300 in a power-on state and a host server 300 in a power-off state in the power supply target, and as a fourth priority candidate, for the host server 300 which is in a power-off state among the host servers 300 associated with the rack 20 possessing the minimum number of computers in a power-on state. That is, priority is given to the result of each search process of the allocation candidate already described in the above.

The allocation candidate search unit 111 specifies a host server 300 with the highest priority as an allocation candidate among the host servers 300 obtained by the search. The allocation unit 112 executes a process of allocating the virtual PC 400 according to the start-of-use request to the host server 300 which has become as an allocation candidate. The power supply management unit 113 executes a process of notifying the host server 300 of the allocation candidate of an instruction to turn on the power source of the virtual PC 400, via the network.

It is also preferable that the managing server 100 stores, in the server management table 125 of the storage unit 101, an allocatable number of the virtual PC 400 and data of the allocated virtual PC 400 in each host server 300, and data defining criteria of calculation performance or power consumption tendency of the host server 300 corresponding to the number of virtual PCs 400 to be provided.

In the present case, the managing server 100 possesses a performance search unit 114 which extracts an allocated number of virtual PCs in each host server 300 from the server management table 125 of the storage unit 101, and searches the server management table 125 of the storage unit 101 for criteria of the calculation performance or power consumption tendency of the host server 300 corresponding to the number of virtual PCs extracted above.

The performance search unit 114 notifies each host server 300 of an instruction indicating change of the calculation performance or the power consumption tendency corresponding to the criteria specified by the search. The host server 300 possesses a unit to change the calculation performance and the power consumption, such as a clock frequency alteration unit of the CPU 304, and a power saving mode management unit.

It is also preferable that the power supply management unit 113 receives a deactivation request of the virtual PC 400 by a user from the virtual PC 400, and monitors whether the power on/off state of the virtual PC 400 is changed from ON to OFF. In the present case, the power supply management unit 113 detects that the power on/off state turns off for all the virtual PCs 400 currently allocated to the host server 300 which has provided the virtual PC 400, and notifies the host server 300 of an instruction to turn off the power source of the host server 300, via the network.

According to the method, it is possible to suppress occurrence of useless power consumption which may be generated by maintaining a power-on state for the host server 300 which does not provide the virtual PC 400 currently.

It is also preferable that the virtual PC 400 possesses an OS-coupling-state notification unit 410 to execute the processes of detecting a communication coupling state with the client machine 200, and frequency of remote operation, and notifying the managing server that the communication coupling with the client machine 200 has been cut off and that no remote operation has been performed for a given length of time.

In the present case, the allocation candidate search unit 111 of the managing server 100 receives the notice from the virtual PC 400, and specifies another host server 300 as an allocation destination of the virtual PC 400 by searching the allocation candidate. The allocation unit 112 executes a process of changing the allocation destination of the virtual PC 400 to the host server 300 of the allocation candidate specified. That is, the virtual PC 400 which is in a power-on state but not used is allocated to the host server 300 of the transfer destination which is searched by the same logic as the search logic of the allocation candidate described above. When executing such a process, the concentration of allocation destinations of the virtual PC 400, that is, the concentration of activated power sources advances further, leading to the reduction of power consumption as the entire system.

It is also preferable that, when changing the allocation destination of an unused virtual PC 400 as described above, the host server 300 or the managing server 100 as the original allocation destination executes hibernation with respect to the virtual PC 400. According to the hibernation, a state just before the power-off of the virtual PC 400 (mainly data on a memory: various data and information of boot application, etc.) is stored in a hard disk drive (a storage unit 101) of the managing server 100 or the host server 300. When the power source of the virtual PC 400 is turned on in the host server 300 of a new allocation destination, the stored information is read from the hard disk drive of the managing server 100 or the original host server 300 to a memory 303 of a new host server 300, and the work can be resumed from the state just before the power-off.

It is possible to consider network boot as the technique of turning on the power source of the host server 300 or the virtual PC 400 via the network 140. The network boot is one of the starting methods of an OS, and is the technique to activate an OS by downloading an image of the OS via a network, instead of activating the OS from a hard disk, etc. For example, the host server 300 can be activated when a disk image (a boot disk) stored on the managing server side is read into a memory of the host server 300. Control of the power on/off of the host server 300 can be executed by performing a Wake-on-LAN request to the host server 300 from the managing server 100, for example.

At the time of allocation of the virtual PC 400, the managing server 100 allocates an IP address to the virtual PC 400. The network boot of the virtual PC 400 is executed based on the IP address. The IP address of the virtual PC 400 of which the allocation is completed is notified to the client machine 200. The managing server 100 which executes the allocation of the IP address and the process of network boot is regarded as a DHCP server (a Dynamic Host Configuration Protocol server), as well as a PXE server (a Preboot eXecution Environment server). The PXE server transfers a boot image to the virtual PC 400 and others which perform network boot. It is possible even for a system equipped only with a formatted hard disk to perform a management operation such as booting, OS installation/updating, and diagnosis at the time of OS failure, by remote operation.

Figure 3:
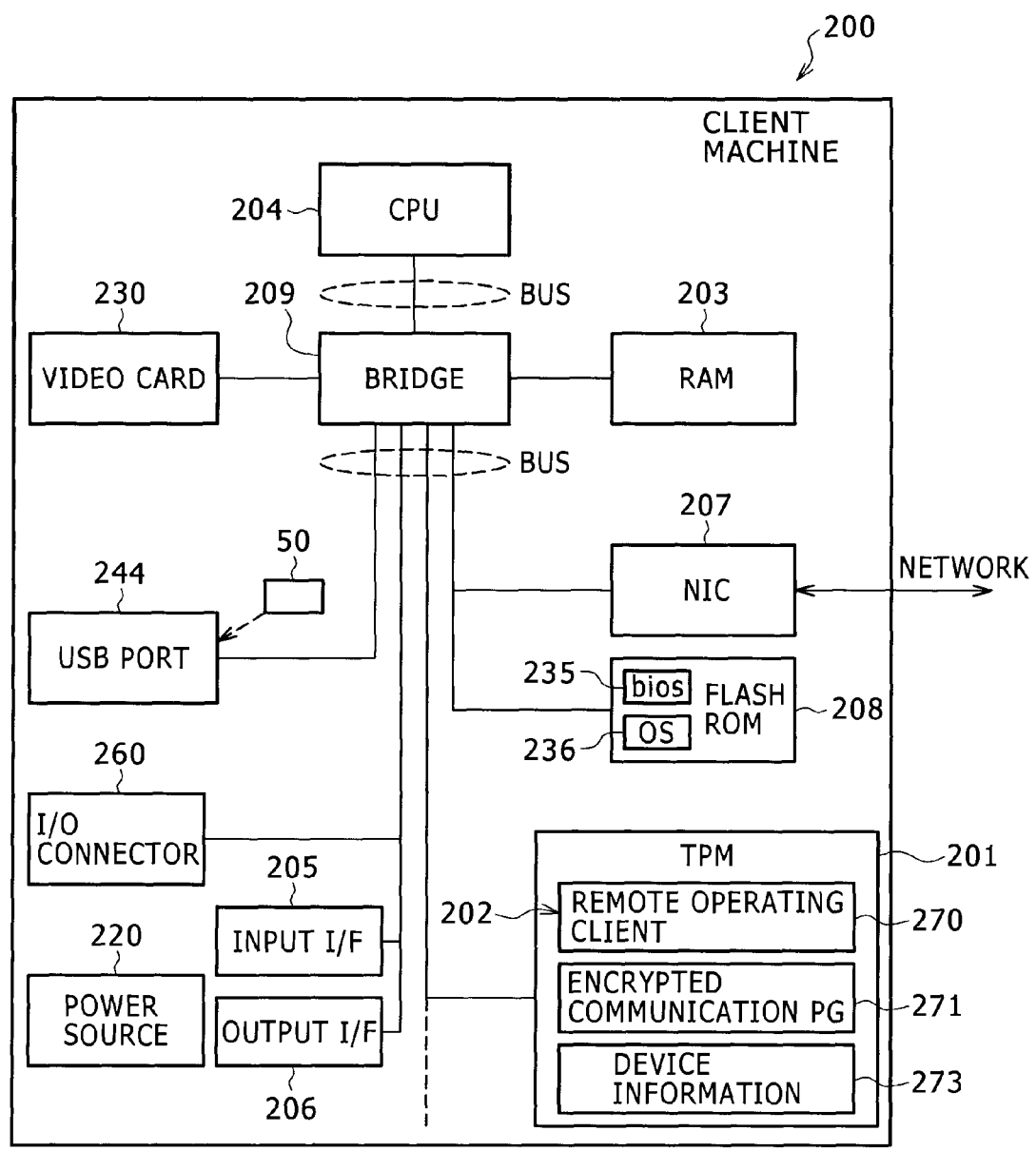
FIG. 3 is a drawing illustrating an example of constitution of a client machine.

Next, the client machine 200 is explained. FIG. 3 illustrates an example of constitution of the client machine 200 of the present embodiment. The client machine 200 is a device which utilizes the host server 300 via the network 140 by a use allocation process of the managing server 100. The client machine 200 reads a program 202 stored in a TPM 201 to a RAM 203 in order to provide a function necessary as a thin client, and a CPU 204 as a processing unit executes the program 202.

The client machine 200 possesses an input interface 205 for various keyboards, buttons and others, which a computer device generally possesses; an output interface 206 for a display etc.; a NIC 207 which performs data transfer with the host server 300, the managing server 100, etc.; and others. With the help of the NIC 207, the client machine 200 executes data transfer by coupling with the host server 300, the managing server 100 and others via the networks 140, such as the Internet and LAN.

The present embodiment assumes the so-called HDD-less thin client terminal as the client machine 200. Not restricted to the present embodiment, the client machine 200 may assume a terminal in which the existing PC provided with an ordinary HDD is made function as a thin client. As to the technique which makes an ordinary PC function as a thin client terminal, what is necessary is just to employ the existing technologies in which a USB memory with a built-in OS is coupled to a USB interface of an ordinary PC, and a series of thin client processing, such as OS boot, VPN coupling, and managing server authentication, are executed (reference: http://www.hitachi-ics.co.jp/product/seihin/jyourou/sec/sec.html etc.).

The client machine 200 further possesses a USB port 244 for coupling various devices, a Flash ROM 208, an I/O connector 260 for coupling a keyboard and a mouse, a video card 230 for coupling a display, a bridge 209 which relays a bus coupled to each of the units 201-260 described above, and a power source 220. The CPU 204 recognizes the system configuration of the client machine 200 by accessing the flash ROM 208 first and executing a BIOS 235 after the power source 220 is activated.

An OS 236 stored in the flash ROM 208 is a program for the CPU 204 to execute a program corresponding to each unit (to be described later), by performing overall control for each of the units 201-260 of the client machine 200. According to the BIOS 235, the CPU 204 loads the OS 236 from the flash ROM 208 to the RAM 203 and executes the OS 236. As the OS 236 of the present embodiment, a comparatively small size OS which can be stored in the flash ROM 208, such as a built-in type OS, is employed.

The client machine 200 naturally possesses, as a thin client terminal, a function to execute a process of requesting virtual PC server allocation to the managing server 100 and a process of coupling establishment with the host server 300, with the use of certificate information, etc., with respect to a user, stored in a portable storage medium 50 (a USB memory) coupled to a USB port 244, and information inputted by the input interface 205, such as a user's ID and a password.

As an example of the portable storage medium 50, there is a USB device for example, which has an IC chip housed in a suitable accommodation case, such as a plastic housing, and which is coupled to the USB port 244 of the client machine 200 in a manner of enabling data communication. Such an IC chip includes a CPU and a memory. As the portable storage medium 50, it is possible to employ an authentication device (proprietary name: KeyMobile) which is a memory card composed of an integrated combination of an IC card unit and a flash memory, and in which a personal certificate, a secret key, a password, and various kinds of application software necessary for mobile use are pre-installed. Information which the portable storage medium 50 stores in the memory thereof can be assumed to include a chip ID, information for authentication in which a personal certificate, a secret key, and a password are stored, an IP address of the managing server 400 which performs a use allocation process between the client machine 200 and the host server 300, and software (OS, software which executes a personal authentication processing with respect to a user of the portable storage medium 50 concerned, etc.).

The client machine 200 possesses naturally the following function as a thin client terminal, by executing a coupling establishment process with the host server 300. Namely, the client machine 200 sends operation information inputted via an input interface 205 of the client machine 200 concerned to an address of the host server 300, receives video information corresponding to the operation information concerned from the host server 300, and displays the received video information on an output interface 206 of the client machine 200 concerned.

The client machine 200 such as described above possesses a remote operating client 270 and an encrypted communication program 271 in the TPM 201. The remote operating client 270 is a program for the client machine 200 to perform remote access to a desktop of the host server 300, and exemplified by a client (a viewer) program of VNC. According to the OS 236, the CPU 204 loads the remote operating client 270 from the TPM 201 to the RAM 203, and executes the remote operating client 270. Accordingly, the CPU 204 sends input information of the I/O connector 260 (contents of operation of a keyboard and a mouse) to the host server 300, for example via the network 140, such as a VPN. The CPU 204 also outputs video information (a desktop screen of a display) sent from the host server 300 concerned via the network 140, such as a VPN, to the output interface 206 for a display etc., which is coupled to the video card 230.

The encrypted communication program 271 is a communication program for constructing a secure communication network, such as a VPN, with the host server 300 possessing an address notified by the remote operating client 270. For example, a communication program using IPsec can be assumed. According to the OS 236, the CPU 204 loads an encrypted communication program 271 from the TPM 201 to the RAM 203, and executes the encrypted communication program 271. Accordingly, the CPU 204 sends a communication start request to the host server 300 assigned to own client machine 200 via the NIC 207, constructs a network, such as a VPN, with the host server 300 concerned, and communicates with the host server 300 concerned via the VPN.

The client machine 200 in the present embodiment possesses device information 273 in the TPM 201. The device information 273 is the information for authentication of the client machine 200 concerned included in a coupling establishment request when the coupling establishment request, etc., are sent from the client machine 200. Specifically, as the device information 273, an ID, a model number, a MAC address, etc., of the client machine 200 can be assumed, for example.

The TPM 201 is a hardware chip which has a function similar to a security chip mounted in a smart card (an IC card), and possesses a calculation function by an asymmetric key, and tamper resistance for keeping these keys safely. The function of the TPM 201 includes, for example, generation and storage of a RSA (Rivest-Shamir-Adleman Scheme) secret key, operation by the RSA secret key (signature, encryption, decoding), hash operation of SHA-1 (Secure Hash Algorithm 1), holding of platform status information (a measurement value of software) (PCR), holding of a reliance chain of a key and a certificate and a credential, high-quality random number generation, a nonvolatile memory, and Opt-in, I/O, etc.

In addition to the function of generation, storage, and calculation of a cryptographic key (an asymmetric key), the TPM 201 possesses a function to safely store and to notify platform status information (a measurement value of software) in a register PCR (Platform Configuration Register) in the TPM. In the newest specification of the TPM, further functions, such as a locality and a delegation (a delegation of power), are added. The TPM 201 is to be physically attached to a part of platform (a mother board etc.).

Figure 4:
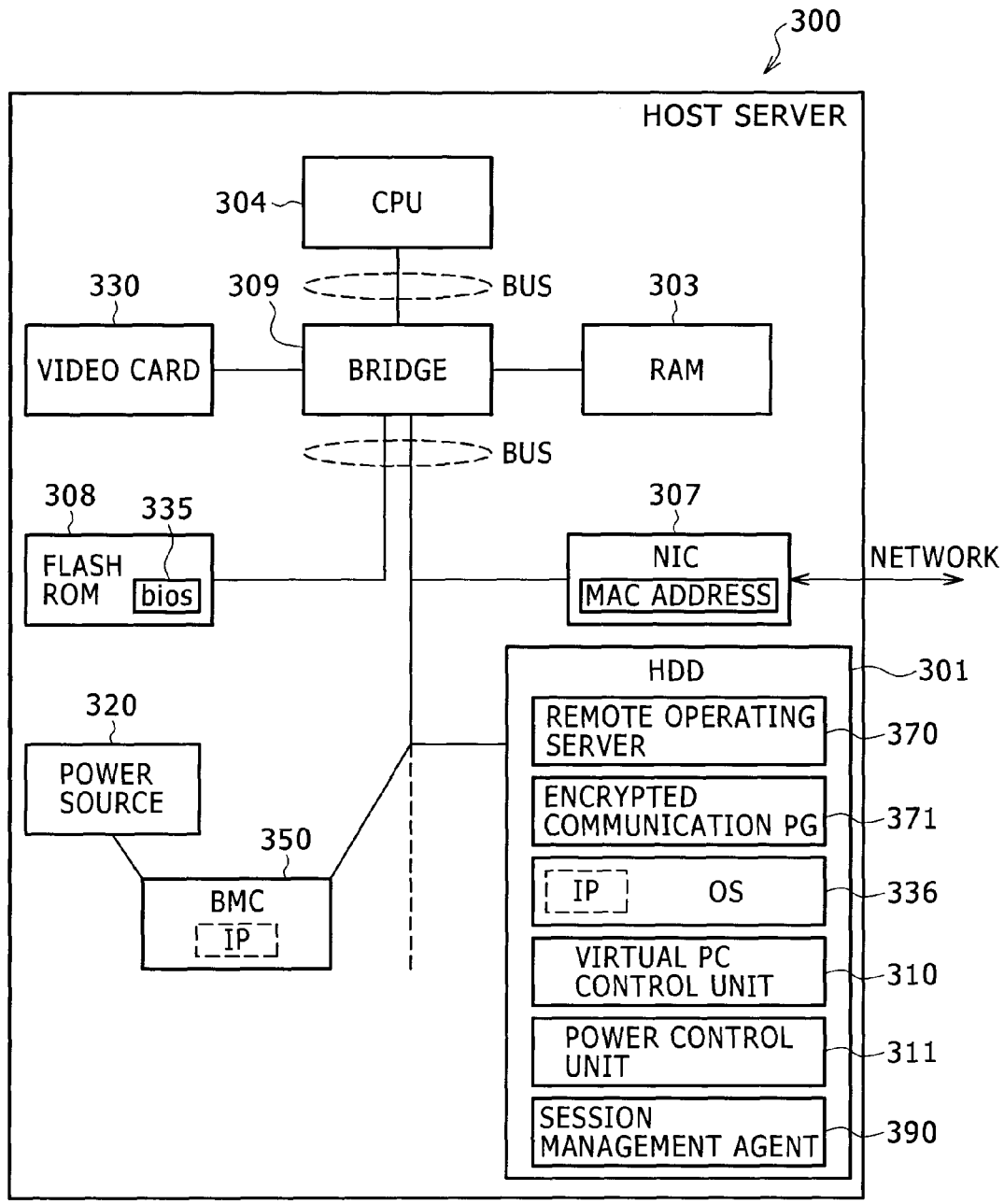
FIG. 4 is a drawing illustrating an example of constitution of a host server.

Next, the host server 300 serving as the computer is explained. FIG. 4 illustrates an example of constitution of the host server 300 of the present embodiment. The host server 300 possesses, in addition to the plural virtual PCs 400 to be provided to the client machine 200, a virtual PC control unit 310 (for example, composed of virtualization software, such as Xen) which executes processes, such as generation, deletion, allocation, deallocation, boot, and halt of the virtual PC 400, and a power control unit 311 (for example, a BMC 350 etc.) which controls ON/OFF of a power source of the host server 300 itself via the network. Although details are omitted, the host server 300 can execute allocation and deallocation of the virtual PC 400 to a host server, so that an arbitrary virtual PC 400 may be executed by an arbitrary host server. For example, storing a file which composes a virtual PC 400 in a file server (not shown) coupled to the network 140, an arbitrary host server 300 provides the virtual PC 400 exclusively using the file. This operation is called allocation.

Such a host server 300 is used being inserted in a chassis 30 installed in a data center, etc., and provides the client machine 200 with the virtual PC 400. The chassis 30 is provided with plural storing compartments 35, and can accept insertion of a host server 300 every storing compartment 35. The host server 300 reads a program 302 stored in a HDD (a hard disk drive) 301, etc., to a RAM 303 so that it may be provided with a necessary function, and makes the CPU 304 as a processing unit execute the program 302.

The host server 300 possesses an input interface 305 for various keyboards, buttons and others, which a computer device generally possesses, and an output interface 306 for a display etc., if needed. The host server 300 possesses also a NIC 307, etc., which performs data transfer with the managing server 100, the virtual PC 400, etc. With the aid of the NIC 307, the host server 300 is coupled with the managing server 100, the client machine 200, and others via the network 140, such as the Internet and LAN, and executes data transfer.

In addition, the host server 300 possesses a flash ROM (Read Only Memory) 308, a video card 330 which generates video information of a desktop, a bridge 309 which relays a bus coupled to each of the units 301-330 described above, and a power source 320.

A BIOS (Basic Input/Output System) 335 is stored in the flash ROM 308. The CPU 304 recognizes the system configuration of the host server 300 by accessing the flash ROM 308 first and executing the BIOS 335 after the power source 320 is activated.

The host server 300 described above stores, in the HDD 301, a remote operating server 370, an encrypted communication program 371, an OS (Operating System) 336, and a session management agent 390. The OS 336 is a program for the CPU 304 to execute each program to materialize each unit, by performing overall control for each of the units 301-330 of the host server 300. According to the BIOS 335, the CPU 304 loads the OS 336 from the HDD 301 to the RAM 303, and executes the OS 336. Accordingly, the CPU 304 performs overall control of each unit of the host server 300.

The remote operating server 370 is a program for enabling a remote operation of a desktop of the host server 300 from the client machine 200, and exemplified by a server program of VNC (Virtual Network Computing) developed at the AT & T Cambridge research institute. According to the OS 336, the CPU 304 loads the remote operating server 370 from the HDD 301 to the RAM 303, and executes the remote operating server 370. Accordingly, the CPU 304 receives and processes input information (contents of operation of a keyboard and a mouse) sent from the client machine 200 via the network 140, such as a VPN, and sends video information (a desktop screen of a display) which indicates the processed result to the client machine 200 via the network 140, such as a VPN.

The encrypted communication program 371 constructs the network 140, such as a VPN, with the client machines 200, and is exemplified by a communication program using an IPsec (Security Architecture for the Internet Protocol). According to the OS 336, the CPU 304 loads the encrypted communication program 371 from the HDD 301 to the RAM 303, and executes the encrypted communication program 371. Accordingly, the CPU 304 constructs a secure network 140, such as a VPN, with the client machine 200 according to a coupling establishment request, etc., received from the client machine 200 via the NIC 307, and communicates with the client machine 200 via the VPN.

The session management agent 390 manages a state of a session in the thin client coupling with the client machine 200 which is allocated via the managing server 100. For example, the session management agent 390 monitors an end of the thin client coupling with the client machine 200, and when the session ends, the session management agent 390 notifies the managing server 100 of the end of the session. The present session management agent 390 acts as an OS-coupling-state notification unit 410 in the virtual PC 400.

Next, the virtual PC 400 is explained (refer to FIG. 1). The virtual PC 400 is provided with a remote operating server 405 which communicates with the remote operating client 270 of the client machine 200, and realizes a remote operation from the client machine 200. The virtual PC 400 is provided with an OS-coupling-state notification unit 410 which, in a situation where the OS 420 is working and the coupling from the client machine 200 to the remote operating server 405 is established, detects that there is no key input from the client machine 200 for a given length of time and notifies the fact to the managing server 100 via the network 140. The virtual PC 400 is also provided with the OS 420.

Fundamentally, the host server 300 possesses a function which can perform processing with the client machine 200 as the thin client server (it is the result of emulating the hardware of the host server 300). Accordingly, the explanation about the hardware configuration, a functional block, etc., which are possessed by the virtual PC 400 is the same as that of the host server 300; therefore, the explanation thereof is omitted.

It is also preferable that each unit 110-114, and 310-311 in each device composing the virtual PC management system 10 described in the above is materialized as a hardware or may be materialized as a program which is stored in a suitable storage device, such as a memory and a HDD (Hard Disk Drive). In the latter case, each of the CPUs reads the corresponding program from a storage device to a RAM and executes the program, in time with the program execution.

With respect to the network 140, besides the Internet and LAN, various networks, such as an ATM line, a privately leased line, WAN (Wide Area Network), a power line network, a wireless network, a public network, and a mobile phone network, are also employable. When virtual exclusive network technologies, such as a VPN (Virtual Private Network) are used, communication with the improved nature of security is preferably established when the Internet is employed.

---Database Structure---

Next, the database structure used in the present embodiment is explained. FIG. 5A illustrates an example of data structure of a server management table 125 in the present embodiment. FIG. 5B illustrates an example of data structure of a user management table 126 in the present embodiment.

The server management table 125 stores each data of: a physical position unit 10 to identify a physical position (for example, a mounting rack etc.) at which the host server 300 is installed; a power control unit 11 to identify a unit of a power supply unit (for example, the chassis 30 etc.) shared by plural host servers 300; a host server ID 12 to identify the host server 300; a power on/off state 13 to indicate whether the power source of the host server 300 is activated (ON) or deactivated (OFF); a virtual PC ID 14 which is an identifier of the virtual PC 400 allocated to the host server 300; a virtual PC power on/off state 15 to indicate whether the virtual power source of the virtual PC 400 is activated (ON) or deactivated (OFF); and an IP address 16 which is a network address of the virtual PC 400.

The managing server 100 uses the server management table 125 to manage correspondence of plural users, plural client machines 200, plural virtual PCs 400, and the host server 300. Namely, the managing server 100 manages, from which client machine 200, which user is performing the remote control of a virtual PC 400 operating on which host server.

Figure 6:
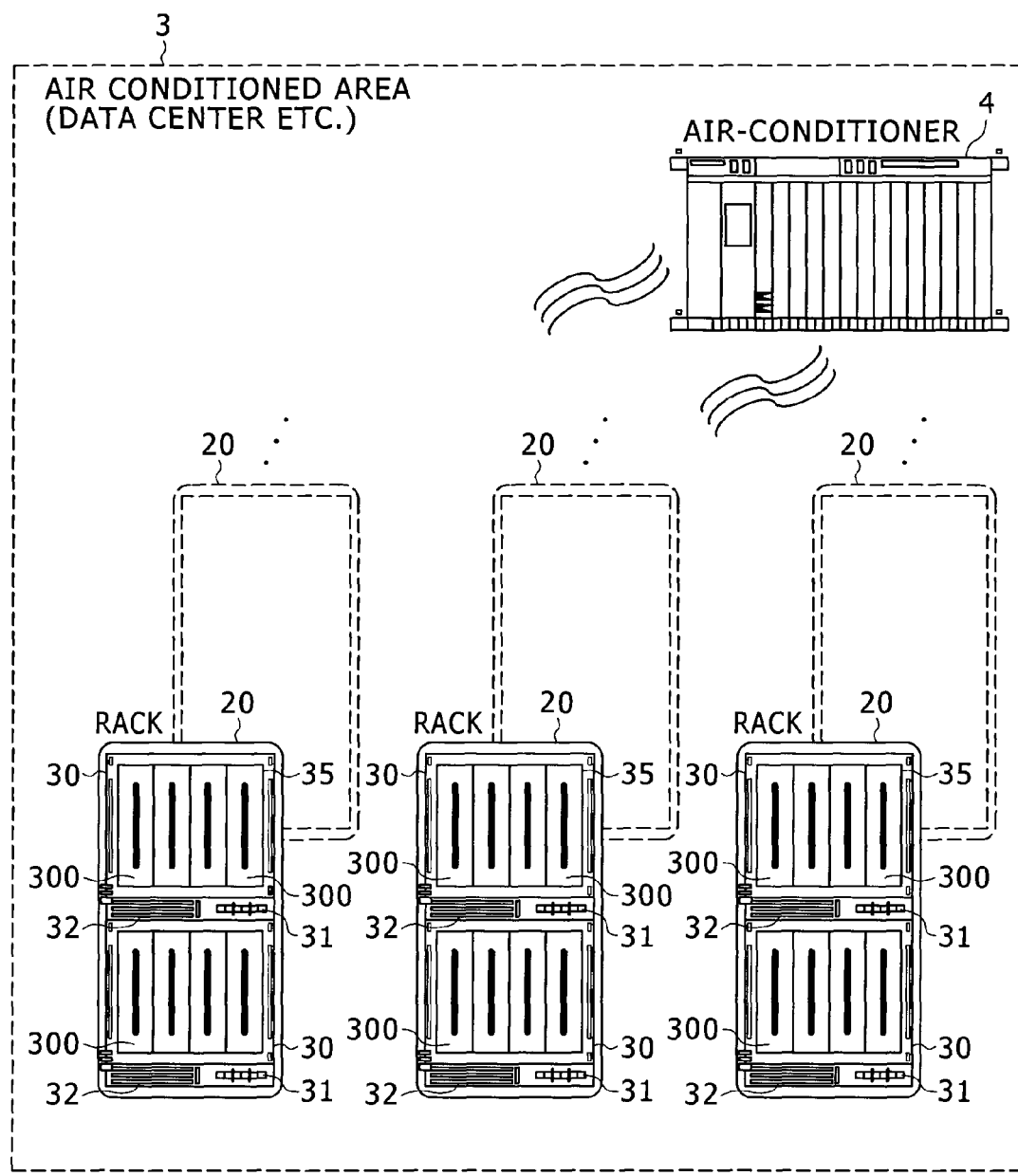
FIG. 6 is a drawing illustrating a conceptual example of an air-conditioned area.

Here, a utilizing method of each data of the physical position unit 10 and the power control unit 11 is explained. FIG. 6 illustrates a conceptual example of an air-conditioned area 3 of the present embodiment. For example, plural host servers 300 (four host servers in the example shown in FIG. 6) is contained in a chassis 30 which is provided with a power unit 31 and a cooling fan 32, and plural chassis 30 (two chassis in the example shown in FIG. 6) are mounted in a rack 20. Plural racks 20 are installed in one room (=the air-conditioned area 3). An air-conditioner 4 is installed in this room, and the entire room is cooled.

In such a case, when there are less chassis 30 which are operating (namely, in power-on state) in the room, the number of the power unit 31 and cooling fans 31 to be operated can be reduced, resulting in electric power saving. When plural chassis 30 working in the room are distributed on plural racks 20 with sufficient balance, a temperature rise of the entire room will be equalized. Therefore, it becomes possible to suppress the amount of operation of the air-conditioner 4 working in the room, resulting in electric power saving.

That is, in a situation where plural racks 20 exist in a space which the air-conditioner 4 should cool (=the air-conditioned area 3), an air-conditioning efficiency will rise when heat generation parts (namely, equipment in a power-on state) are kept from being unevenly distributed. In the following explanation of the present embodiment, it is assumed that the power control unit 11 is the chassis 30 and the physical position unit 10 is the rack 20.

The user management table 126 stores information about a user who utilizes the virtual PC 400 using the client machine 200. The user management table 126 is a collective entity of a record which associates the user identifier 17 to identify the user with the virtual PC ID 18 as an identifier of the virtual PC 400 allocated to the user. Since the managing server 100 performs the allocation of a user to the virtual PC 400, the managing server 100 also generates and manages the present user management table 126.

---Example 1 of Process Flow---

Figure 7:
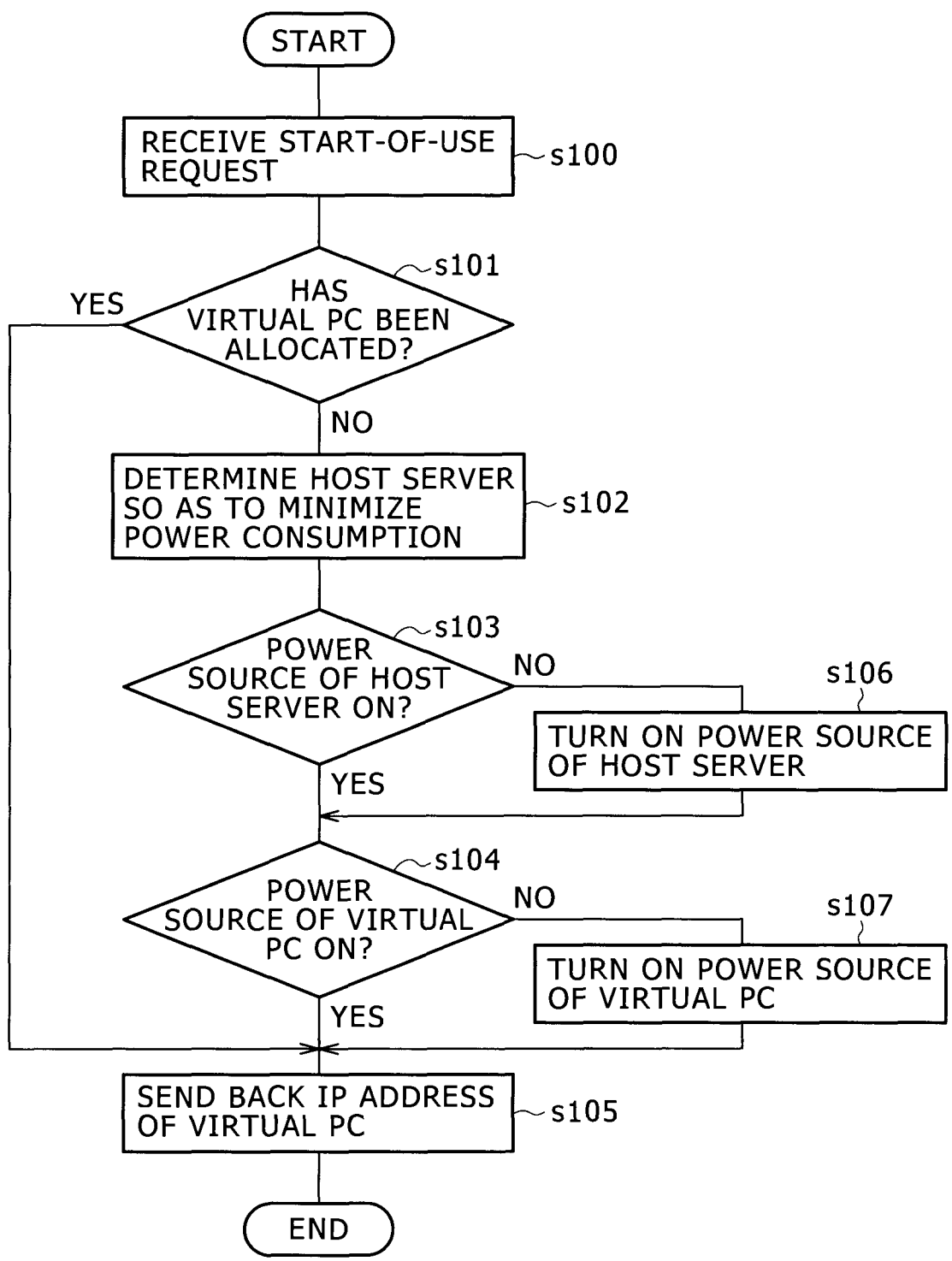
FIG. 7 is a chart illustrating a process flow 1 of a virtual PC management method.

Hereafter, an actual procedure of the virtual PC management method in the present embodiment is explained based on drawings. FIG. 7 illustrates Example 1 of the process flow of the virtual PC management method in the present embodiment. Various operations corresponding to the virtual PC management method explained in the following are materialized by programs read into the respective RAMs and executed by the managing server 100, the host server 300, the virtual PC 400, the client machine 200, and others, which compose the information processor system 10. The programs are composed of codes for performing various kinds of operations explained in the following.

Here, an entire flow is first explained, such as the allocation of the virtual PC 400 for performing the remote control of the virtual PC 400 from the client machine 200, and the power control. In the present case, the client machine 200 executes a start-of-use request process of the virtual PC 400 allocated to the user using the remote operating client 270, after executing the user authentication using a user ID and a password which are entered by the user via the input interface 205. The remote operating client 270 of the client machine 200 sends the start-of-use request attached with the user ID to the managing server 100.

On the other hand, the allocation candidate search unit 111 of the managing server 100 receives the start-of-use request from the remote operating client 270 of the client machine 200 (Step S100). The allocation candidate search unit 111 acquires the virtual PC ID 18 corresponding to the user ID from the user management table 126 of the storage unit 101, and checks whether the virtual PC ID 18 concerned exists in the server management table 125 (Step S101). When the virtual PC ID 18 corresponding to the user ID is already set up in the server management table 125, the allocation candidate search unit 111 determines that the allocation of the virtual PC 400 to the user has been performed (Step S101: yes), and returns the corresponding IP address 16 (extracted from the server management table 125) to the remote operating client 270 of the client machine 200 (Step S105).

On the other hand, when the virtual PC ID 18 corresponding to the user ID is not yet set up in the server management table 125 at Step S101, the allocation candidate search unit 111 determines that the virtual PC 400 is not allocated to the user (Step S101: no). The allocation candidate search unit 111 determines a host server 300 to which the virtual PC 400 for the user is to be allocated, namely, a host server 300 of an allocation candidate, so as to minimize the power consumption (Step S102). The allocation unit 112 of the managing server 100 executes a process of allocating the virtual PC 400 according to the start-of-use request to the host server 300 of the allocation candidate (example: the ID of the virtual PC 400 in the host server 300 of the allocation candidate and the user ID are associated with each other, using the user management table 126). The process at Step S102 will be explained in full detail in Example 2 of the process flow.

Next, the power supply management unit 113 of the managing server 100 checks whether data of the power on/off state 13 is "ON" with respect to the host server 300 of the allocation candidate in the server management table 125 (Step S103). When the power on/off state of the host server 300 of the allocation candidate is "OFF", or the power source is not activated (Step S103: no), the power supply management unit 113 instructs the power control unit 311 (a BMC 350) of the host server 300 to turn on the power of the host server 300 via the network (Step S106).

When the power on/off state of the host server 300 of the allocation candidate is "ON", or the power source is activated, on the other hand (Step S103: yes), the power supply management unit 113 of the managing server 100 checks whether data of the virtual PC power on/off state 15 is "ON" in the server management table 125 (Step S104). When the power source of the virtual PC 400 is not activated (Step S104: no), the power supply management unit 113 of the managing server 100 instructs the virtual PC control unit 310 of the host server 300 to turn on the power of the virtual PC 400 via the network (Step S107). At this time, the performance setup of the host server 300 may be changed according to the number of virtual PCs 400 allocated to the host server 300. For example, when there are a small number of the allocated virtual PCs, the mode of operation of the CPU 304 of the host server 300 is set to a low speed and low power consumption, etc.

When the power on/off state of the virtual PC 400 is set to ON by the process at Step S107, the allocation candidate search unit 111 returns the IP address 16 (extracted from the server management table 125) corresponding to the virtual PC 400 to the remote operating client 270 of the client machine 200 (Step S105), and completes the process.

It is assumed that each data of the power on/off state 13 of the host server 300 and the virtual PC power on/off state 15 in the server management table 125 has been acquired in advance by the power on/off state acquiring unit 110 of the managing server 100 and has been set in the server management table 125. In the present case, the power on/off state acquiring unit 110 acquires the power on/off state of the virtual PC 400 from the host server 300 via the network, stores the present power on/off state data in the server management table 125 of the storage unit 101. Moreover, the power on/off state acquiring unit 110 acquires the power on/off state of the host server 300 from the host server 300 (a BMC 350) via the network, and stores the present power on/off state data in the server management table 125 of the storage unit 101.

---Example 2 of Process Flow---

Figure 8:
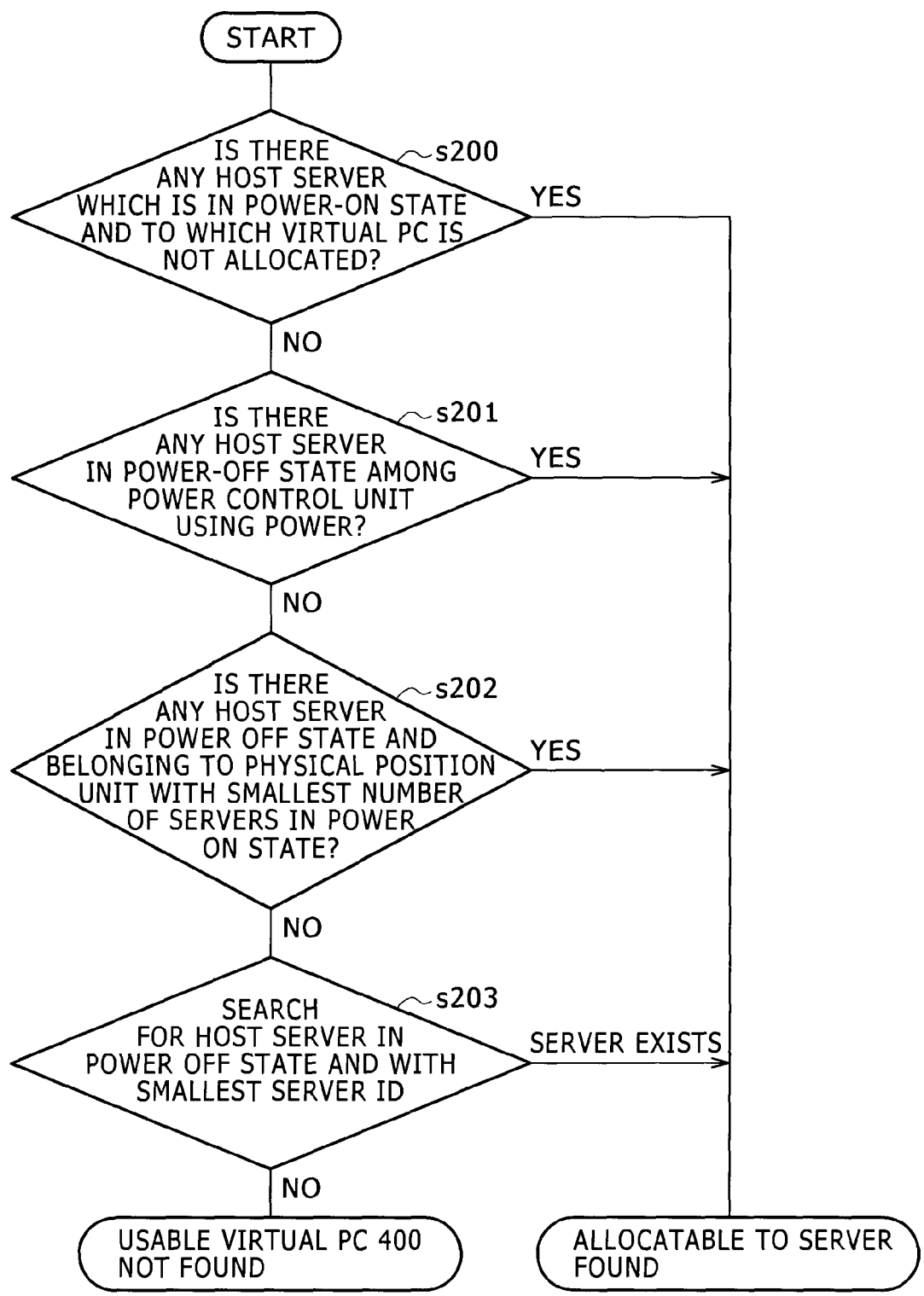
FIG. 8 is a chart illustrating a process flow 2 of a virtual PC management method.

FIG. 8 illustrates Example 2 of the process flow of the virtual PC management method in the present embodiment. The figure shows an algorithm by which the managing server 100 allocates the virtual PC 400 to the host server 300 so as to minimize the power consumption.

Here, the allocation candidate search unit 111 of the managing server 100 searches the server management table 125 of the storage unit 101 for a host server 300 which is in a power-on state and to which the virtual PC 400 is not allocated (in other words, a host server 300 which is in a power-on state and of which the number of allocated virtual PCs is smaller than the allocatable number), as an allocation candidate (Step S200). An increase in power consumption from the present state can be suppressed, by allocating the virtual PC 400 to the host server 300 of which the power source is already set to ON and which has allocatable capacity of the virtual PC 400, rather than turning on a power source of a host server 300 which is currently in a power-off state and allocating the virtual PC 400 to the host server 300 newly. When a host server 300 which falls into the case can be searched at Step S200 (Step S200: yes), the allocation of the virtual PC 400 is performed with the host server 300 concerned as an allocation candidate.

When a host server 300 which falls into the case can not be searched at Step S200 (Step S200: no), the allocation candidate search unit 111 performs a process with attention paid to data of the power control unit 11 in the server management table 125. In the present case, the allocation candidate search unit 111 searches the server management table 125 for a chassis 30 in which a host server 300 in a power-on state and a host server 300 in a power-off state are both included in the power supply target. The allocation candidate search unit 111 specifies a host server 300 which is in a power-off state and included in the power supply target of the chassis 30 searched here, as an allocation candidate (Step S201).

Namely, by confirming the power on/off state of every chassis 30 (=a power supply unit) which accommodates the host server 300, and by making the host server 300 in a power-off state as an allocation candidate in the chassis 30 in which a host server 300 in a power-on state and a host server 300 in a power-off state are intermingled, it is possible to avoid a new resumption of power supply to the chassis 30 in which all the accommodated host servers 300 are currently in a power-off state, for example, and it is possible to suppress an increase in power consumption by using the chassis 30 in which a power supply is already practiced.

When the host server 300 can be specified at Step S201 (Step S201: yes), the power supply management unit 113 notifies the host server 300 of the allocation candidate of an instruction to turn on the power source via the network (Step S106).

On the other hand, when the host server 300 can not be specified at Step S201 (Step S201: no), the allocation candidate search unit 111 performs a process with attention paid to data of the physical position unit 10 in the server management table 125. At this time, the allocation candidate search unit 111 extracts, from the server management table 125 of the storage unit 101, the chassis 30 accommodated in each rack 20, the host server 300 as the power supply target of the chassis 30 concerned, and power on/off state data of each host server 300. Next, the allocation candidate search unit 111 specifies a rack 20 possessing a minimum number of host server in a power-on state, by calculating the number of host server in a power-on state for every rack, and specifies, as an allocation candidate, a host server 300 in a power-off state among the host servers 300 associated with the rack 20 specified here (Step S202).

Namely, a rack 20 of which the current power consumption is minimum among the racks 20 is specified, and when the host server 300 therein has allocatable capacity of the virtual PC 400, the virtual PC 400 is allocated to the host server 300 concerned. Accordingly, power consumption among the racks is balanced.

When the host server 300 can be specified at Step S202 (Step S202: yes), the power supply management unit 113 notifies the host server 300 of the allocation candidate of an instruction to turn on the power source via the network (Step S106).

When the host server 300 can not be specified at Step S202 (Step S202: no), the allocation candidate search unit 111 selects, as an allocation candidate, a host server 300 which has a smallest host server ID and the power on/off state 13 of OFF, from the server management table 125 (Step S203). When the host server 300 can be specified at Step S203 (Step S203: yes), the power supply management unit 113 notifies the host server 300 of the allocation candidate of an instruction to turn on the power source via the network (Step S106). When the host server 300 can not yet be specified even at Step S203 (Step S203: no), the allocation candidate search unit 111 sends back a notice that a usable virtual PC 400 has not been found, to the client machine 200, since an allocatable host server 300 has not been found. Then the process is terminated.

As mentioned above, the allocation candidate search unit 111 executed the process of searching the server management table 125 of the storage unit 101 for the host server 300, in the order of: the first priority (a host server 300 which is in a power-on state and to which the virtual PC 400 is not allocated), the second priority (a host server 300 which is in a power-off state and included in the power supply target of the chassis 30 including a host server 300 in a power-on state and a host server 300 in a power-off state in the power supply target), the third priority (a host server 300 which is in a power-off state among the host servers 300 associated with the rack 20 in which the number of computers in a power-on state is minimum), and the fourth priority (a host server 300 of which the host server ID is the smallest and the power on/off state 13 is OFF). That is, priority is given to the result of each search process of an allocation candidate.

The allocation unit 112 of the managing server 100 selects the host server 300 by employing the algorithm, sets the virtual PC ID concerned to the virtual PC ID 14 of the server management table 125, and sets the virtual PC power on/off state 15 as OFF.

---Example 3 of Process Flow---

Figure 9:
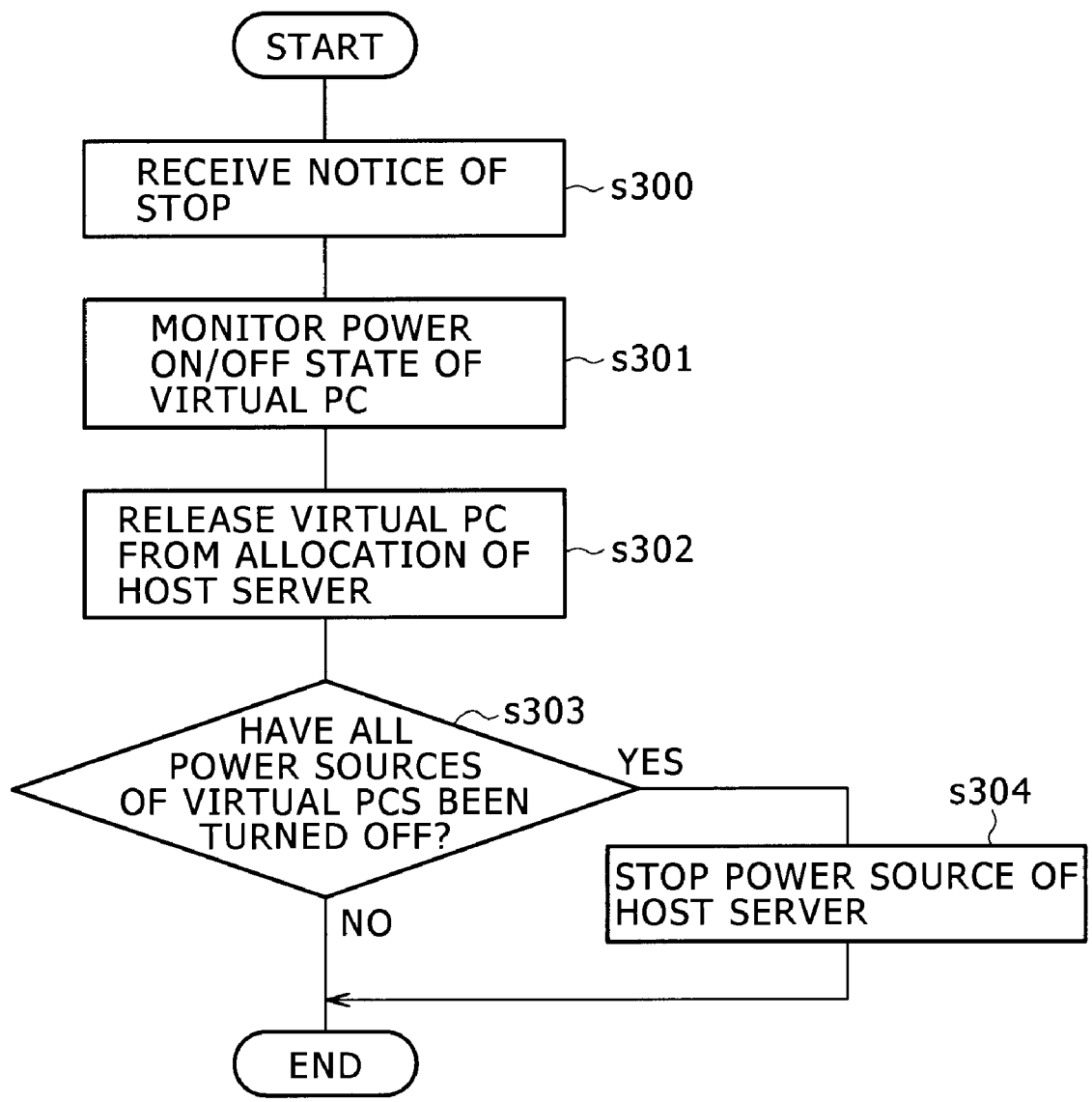
FIG. 9 is a chart illustrating a process flow 3 of a virtual PC management method.

Next, operation of the power supply management unit 113 of the managing server 100 is shown for the case where a user stops the virtual PC 400 allocated to the user, from client machine 200. FIG. 9 illustrates Example 3 of the process flow of the virtual PC management method in the present embodiment.

When a user stops the OS 420 of the virtual PC 400, the OS-coupling-state notification unit 410 of the virtual PC 400 sends a notice of the fact to the power supply management unit 113 of the managing server 100.

The power supply management unit 113, upon receiving the notice (Step S300), inquires to the virtual PC control unit 310 of the host server 300 (which provides the virtual PC 400) whether the power source of the virtual PC 400 has stopped, and monitors the power on/off state until the power stops (Step S301). The power supply management unit 113 instructs the virtual PC control unit 310 of the host server 300 to release the virtual PC 400 concerned from the allocation of the host server 300. In addition, the power supply management unit 113 deletes the ID of the virtual PC 400 from a column of the virtual PC ID 14 of the server management table 125 (S302).

Next, the power supply management unit 113 checks the server management table 125 whether all the virtual PC ID 14 associated with the host server 300 are not allocated, namely, whether the power source of all the virtual PCs 400 are stopped (Step S303). As a result, confirming the state that no virtual PC 400 allocated to the host server 300 can be found (Step S303: yes), the power supply management unit 113 instructs the power control unit 311 of the host server 300 to stop the power source of the host server 300 (Step S304).

According to the present method, it is possible to suppress occurrence of useless power consumption which may be generated by maintaining a power-on state for the host server 300 which does not provide the virtual PC 400 currently.

---Example 4 of Process Flow---

Figure 10:
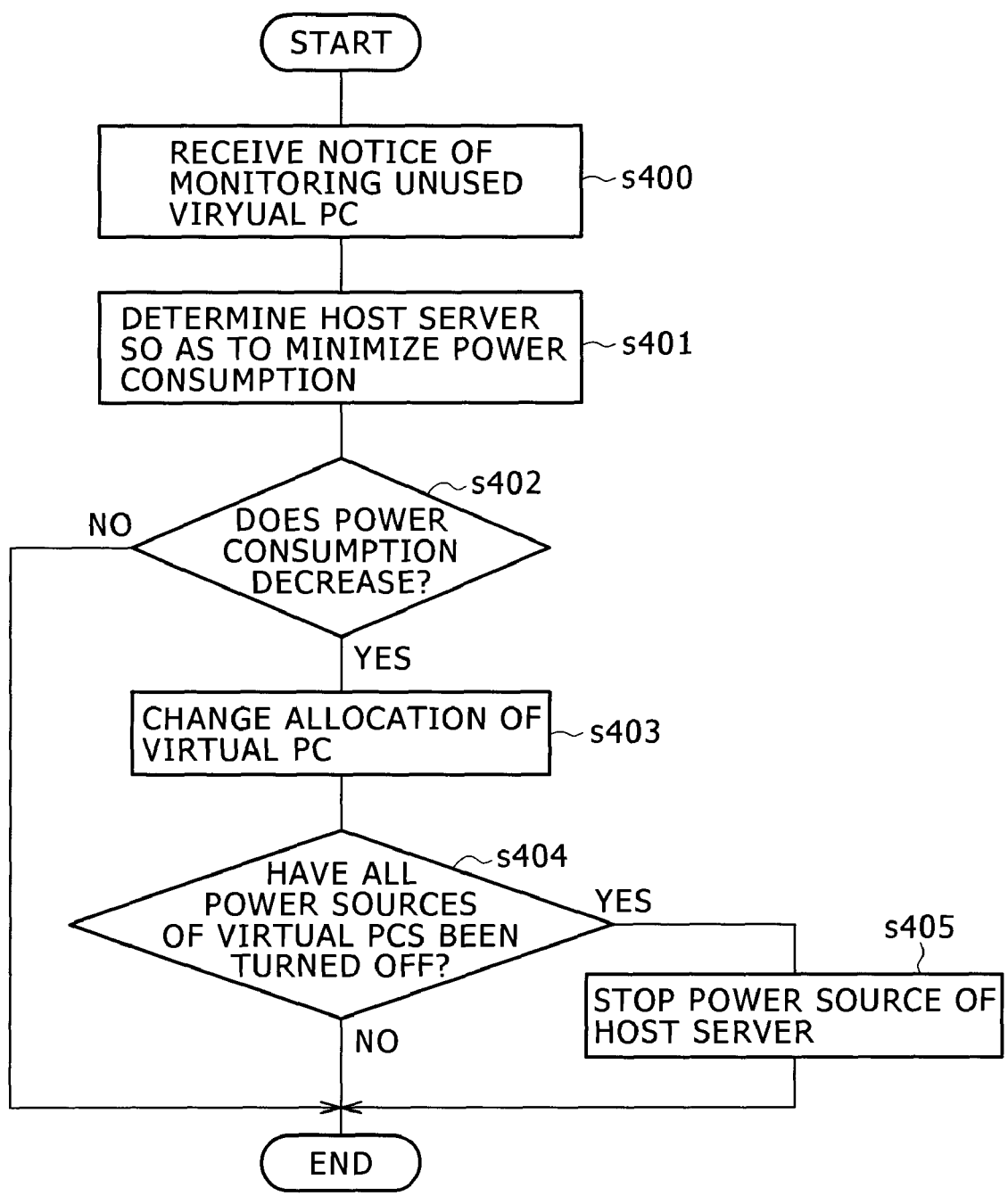
FIG. 10 is a chart illustrating a process flow 4 of a virtual PC management method.

FIG. 10 illustrates Example 4 of the process flow of the virtual PC management method in the present embodiment. Next, a process in which reallocation of the virtual PC 400 is performed so as to attain more electric power saving is explained, for a case where the thin client coupling is cut while a user keeps activating the power source of the virtual PC 400, or for a case where a user does not perform inputting for a given length of time.

In the present case, the OS-coupling-state notification unit 410 of the virtual PC 400 executes the processes of detecting a communication coupling state with the client machine 200 and frequency of remote operation, and notifying the managing server that the communication coupling with the client machine 200 has been cut off and that no remote operation has been performed for a given length of time.

On the other hand, the allocation candidate search unit 111 of the managing server 100 receives, from the OS-coupling-state notification unit 410, the notice that the coupling between the remote operating server 405 and the client machine 200 has been cut off, and that no key input has been performed for a given length of time from the client machine 200 (Step S400). Similarly to the process of Example 2 of the process flow, the allocation candidate search unit 111 determines the host server 300 of another destination of the virtual PC 400, so as to minimize the power consumption (Step S401).

Next, the allocation candidate search unit 111 of the managing server 100 confirms whether the power consumption becomes less than that of the present state, by moving the virtual PC 400 to the host server 300 determined at Step S401 (Step S402). For example, the allocation candidate search unit 111 confirms whether the host server 300 of which the power on/off state 13 is OFF in the server management table 125 increases in number. If there is no change or increase in the number of the host servers 300 of which the power on/off state is ON, in spite of the fact that the virtual PC 400 is moved to the other host server 300, there is no meaning in the moving.

The processes at Steps S400, S401, and S402 may be executed based on a notice from two or more sets of virtual PCs 400. For example, it is confirmed whether the power consumption becomes less, by calculating if the power source of a host server 300 can be turned OFF by moving the virtual PCs by a set of two.

The process is terminated when it is confirmed that the power consumption does not decrease (Step S402: no). On the other hand, when it is confirmed that the power consumption decreases (Step S402: yes), the allocation unit 112 of the managing server 100 instructs the virtual PC control unit 310 of the host server 300 (one which has provided the virtual PC 400 up to now) to move the virtual PC 400 to the host server 300 of the movement destination, and changes the server management table 125 to a state after moving (namely, to change the setting of the ID of the virtual PC 400 for the host server 300) (Step S403).

In this way, as to the virtual PC 400 which is in a power-on state but not used, a host server 300 as the movement destination is searched out and allocated by the same logic as the search logic for an allocation candidate as described above. When executing such a process, the concentration of allocation destinations of the virtual PC 400, that is, the concentration of activated power sources, advances further, leading to the reduction of power consumption as the entire system.

Following Step S403, the power supply management unit 113 receives a deactivation request for the virtual PC 400, detects that the power on/off state of all the virtual PCs 400 currently allocated to the host server 300 which has provided the virtual PC 400 originally becomes off (Step S404: yes), and notifies the host server 300, via a network, of an instruction to turn off the power source of the host server 300 (Step S405).

---Other Examples---

In addition, it is also preferable to execute a process for changing a performance setup of the host server 300, according to the number of virtual PCs 400 allocated to the host server 300, for example. In the present case, the managing server 100 stores, in the server management table 125 of the storage unit 101, an allocatable number of the virtual PC 400 and data of the allocated virtual PC 400 in each host server 300, and data which defines criteria of calculation performance or a power consumption tendency of the host server 300 according to the number of virtual PCs 400 to be provided.

The performance search unit 114 of the managing server 100 extracts the number of allocated virtual PCs in each host server 300 (for example, the number of virtual PC=2), from the server management table 125 of the storage unit 101. The performance search unit 114 searches the server management table 125 of the storage unit 101 for the criteria of the calculation performance or power consumption tendency of the host server 300, corresponding to the number of virtual PCs extracted here; for example, "when the number of virtual PC=2, the calculation performance=70% and the power consumption tendency=electric power saving mode", etc.

The performance search unit 114 notifies each host server 300 of an alteration instruction to the calculation performance or power consumption tendency corresponding to the criteria specified by the search. The host server 300 possesses a unit to change the calculation performance and the power consumption, such as a clock frequency alteration unit of CPU 304, and a power saving mode management unit.

According to the present embodiment described above, in a thin client system using a virtual PC, the power source of a host server which provides the virtual PC is controlled and plural virtual PCs are concentrated on a small number of host servers, at the timing when a user requests a start and an end of remote operation. Accordingly, the number of host servers to be utilized is reduced and the power consumption of the host servers to be utilized can be reduced.

Therefore, it is possible to reduce the power consumption in the thin client system using a virtual PC.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A virtual PC management method carried into execution by a managing server operable to manage, in a storage unit, correspondence relation between a virtual machine remotely operable by a client machine via a network and a computer to provide the virtual machine concerned, the managing server performing the processes of:
   acquiring a power on/off state of the virtual machine from the computer via the network as first power on/off state data and storing the first power on/off state data into the storage unit;
   acquiring a power on/off state of the computer from the computer via the network as second power on/off state data and storing the second power on/off state data into the storage unit;
   receiving a start-of-use request for a virtual machine from the client machine and searching the stored data of the storage unit for a computer which is in a power-on state and to which a virtual machine is not allocated, as an allocation candidate;
   allocating the virtual machine in accordance with the start-of-use request to the computer of the allocation candidate;
   notifying, via the network, the computer of the allocation candidate of an instruction to turn on the power of the virtual machine;
   monitoring whether the power on/off state of the virtual machine is changed from on to off; and
   detecting that the power on/off state turns off for all the virtual machines allocated to the computer which have provided the virtual machine, and notifying, via the network, the computer of an instruction to turn off the power of the computer,
   wherein the virtual machine performs the processes of:
   detecting a state of communication coupling with the client machine and frequency of remote operation; and
   notifying the managing server with a notice that communication coupling with the client machine has been cut off or that no remote operation has been performed for a given length of time, and
   wherein the managing server further performs the processes of:
   receiving the notice from the virtual machine; and
   specifying another computer as an allocation destination of the virtual machine by searching for the allocation candidate, and changing the allocation destination of the virtual machine to the computer of the allocation candidate specified.

2. The virtual PC management method of claim 1, wherein the managing server stores, in the storage unit, an allocatable number of virtual machines and data of an allocated virtual machine in each computer, and
   wherein the managing server performs the processes of:
   receiving the start-of-use request from the client machine, and searching the stored data of the storage unit for a computer which is in a power-on state and possesses the number of allocated virtual machines smaller than the allocatable number, as an allocation candidate; and
   allocating the virtual machine in accordance with the start-of-use request to the computer of the allocation candidate.

3. The virtual PC management method of claim 1, wherein the managing server stores, in the storage unit, correspondence relation between the computer and a power supply unit which supplies power to the computer concerned, and
   wherein the managing server performs the processes of:
   receiving a start-of-use request for a virtual machine from the client machine, searching the stored data of the storage unit for a power supply unit possessing a power supply target which includes a computer in a power-on state and a computer in a power-off state, and specifying, as an allocation candidate, a computer in a power-off state included in the power supply target of the searched power supply unit;

notifying, via the network, the computer of the allocation candidate of an instruction to turn on the power; and allocating the virtual machine in accordance with the start-of-use request to the computer which becomes in a power-on state.

4. The virtual PC management method of claim 1, wherein the managing server stores, in the storage unit, correspondence relation between the computer and a housing device to accommodate a power supply unit which supplies power to the computer concerned, and wherein the managing server performs the processes of:

receiving a start-of-use request for a virtual machine from the client machine, extracting, from the stored data of the storage unit, a power supply unit accommodated in each housing device and a computer as a power supply target of the power supply unit concerned and power on/off state data of each computer, specifying a housing device accommodating a smallest number of computers in a power-on state by calculating the number of computers in a power-on state for every housing device, and specifying, as an allocation candidate, a computer in a power-off state among the computers associated with the specified housing device;

notifying, via the network, the computer of the allocation candidate of an instruction to turn on the power of the computer concerned; and allocating the virtual machine in accordance with the start-of-use request to the computer which becomes in a power-on state.

5. The virtual PC management method of claim 1, wherein the managing server stores, in the storage unit, an allocatable number of virtual machines and data of an allocated virtual machine in each computer, data of correspondence relation between the computer and a power supply unit which supplies power to the computer concerned, and data of correspondence relation between the computer and a housing device accommodating the power supply unit which supplies power to the computer concerned, and wherein the managing server performs the processes of:

receiving a start-of-use request for a virtual machine from the client machine, searching the stored data of the storage unit, as a first priority candidate, for a computer which is in a power-on state and to which a virtual machine is not allocated, as a second priority candidate, for a computer which is in a power-on state and possesses allocated virtual machines the number of which is smaller than an allocatable number, as a third priority candidate, for a computer which is in a power-off state and included in a power supply target of the power supply unit including a computer in a power-on state and a computer in a power-off state in the power supply target, and, as a fourth priority candidate, for a computer which is in a power-off state among computers associated with a housing device accommodating the smallest number of computers in a power-on state;

specifying as an allocation candidate a computer possessing highest priority among the computers searched by the searching, and allocating the virtual machine in accordance with the start-of-use request to the computer; and notifying, via the network, the computer of the allocation candidate of an instruction to turn on the power of the virtual machine.

6. The virtual PC management method of claim 1, wherein the managing server stores, in the storage unit, an allocatable number of virtual machines and data of an allocated virtual machine in each computer, and data defining criteria of one of calculation performance and power consumption tendency of a computer corresponding to the number of virtual machines to be provided, and wherein the managing server performs the processes of:

extracting from the stored data of the storage unit the number of allocated virtual machines in each computer and searching the stored data of the storage unit for criteria of one of calculation performance and power consumption tendency of a computer corresponding to the extracted number of virtual machines; and notifying each computer of an instruction indicating change to one of the calculation performance and the power consumption tendency corresponding to the criteria specified by the searching.

7. A virtual PC management system serving as a computer system for managing, in a storage unit, correspondence relation between a virtual machine remotely operable by a client machine via a network and a computer to provide the virtual machine concerned, the virtual PC management system comprising:

a first storing unit configured to acquire a power on/off state of the virtual machine from the computer via the network as first power on/off state data and to store the first power on/off state data into the storage unit;

a second storing unit configured to acquire a power on/off state of the computer from the computer via the network as second power on/off state data and to store the second power on/off state data into the storage unit;

a first detecting unit configured to receive a start-of-use request for a virtual machine from the client machine and to search stored data of the storage unit for a computer which is in a power-on state and to which a virtual machine is not allocated, as an allocation candidate;

an allocating unit configured to allocate the virtual machine in accordance with the start-of-use request to the computer of the allocation candidate; and a notifying unit configured to notify, via the network, the computer of the allocation candidate of an instruction to turn on the power of the virtual machine;

a monitoring unit configured to monitor whether the power on/off state of the virtual machine is changed from on to off;

a second detecting unit configured to detect that the power on/off state turns off for all the virtual machines allocated to the computer which has provided the virtual machine, and notifying, via the network, the computer of an instruction to turn off the power of the computer, wherein in response to the virtual machine performing the processes of: detecting a state of communication coupling with the client machine and frequency of remote operation; and notifying the managing server with a notice that communication coupling with the client machine has been cut off and that no remote operation has been performed for a given length of time, a receiving unit configured to receive the notice from the virtual machine; and a specifying unit configured to specify another computer as an allocation destination of the virtual machine by searching for the allocation candidate, and changing the allocation destination of the virtual machine to the computer of the allocation candidate specified.

8. A virtual PC management program, embodied in a non-transitory medium, executable by a computer which manages, in a storage unit, correspondence relation between a virtual machine remotely operable by a client machine via a network and a computer to provide the virtual machine concerned, the program, when executed by the computer, comprising:

acquiring a power on/off state of the virtual machine from the computer via the network as first power on/off state data and storing the first power on/off state data into the storage unit;

acquiring a power on/off state of the computer from the computer via the network as second power on/off state data and storing the second power on/off state data into the storage unit;

receiving a start-of-use request for a virtual machine from the client machine and searching the stored data of the storage unit for a computer which is in a power-on state and to which a virtual machine is not allocated, as an allocation candidate;

allocating the virtual machine in accordance with the start-of-use request to the computer of the allocation candidate; and notifying, via the network, the computer of the allocation candidate of an instruction to turn on the power of the virtual machine, monitoring whether the power on/off state of the virtual machine is changed from on to off;

detecting that the power on/off state turns off for all the virtual machines allocated to the computer which have provided the virtual machine, and notifying, via the network, the computer of an instruction to turn off the power of the computer, detecting, via the virtual machine, a state of communication coupling with the client machine and frequency of remote operation;

notifying, via the virtual machine, the managing server with a notice that communication coupling with the client machine has been cut off or that no remote operation has been performed for a given length of time, receiving the notice from the virtual machine; and specifying another computer as an allocation destination of the virtual machine by searching for the allocation candidate, and changing the allocation destination of the virtual machine to the computer of the allocation candidate specified.

* * * * *